United States Patent [19]
Beser

[11] Patent Number: 6,070,246
[45] Date of Patent: May 30, 2000

[54] METHOD AND SYSTEM FOR SECURE CABLE MODEM INITIALIZATION

[75] Inventor: Nurettin B. Beser, Evanston, Ill.

[73] Assignee: 3Com Corporation, Santa Clara, Calif.

[21] Appl. No.: 09/018,756

[22] Filed: Feb. 4, 1998

[51] Int. Cl.$^7$ .................................................. G06F 11/00
[52] U.S. Cl. .......................................................... 713/201
[58] Field of Search ..................................... 713/200, 201, 713/1; 707/203; 709/219, 217, 220; 380/23, 30

[56] References Cited

U.S. PATENT DOCUMENTS

| | | | |
|---|---|---|---|
| 5,014,234 | 5/1991 | Edwards, Jr. ............................ | 364/900 |
| 5,138,712 | 8/1992 | Corbin .................................... | 395/700 |
| 5,623,601 | 4/1997 | Vu ........................................ | 395/187.01 |
| 5,799,086 | 8/1998 | Sudia ...................................... | 380/23 |
| 5,958,007 | 9/1999 | Lee et al. ................................ | 709/219 |

*Primary Examiner*—Dennis M. Butler
*Assistant Examiner*—Omar A. Omar
*Attorney, Agent, or Firm*—McDonnell Boehnen Hulbert & Berghoff; Stephen Lesavich

[57] ABSTRACT

A method and system for secure cable modem initialization in a data-over-cable system is provided using a secure protocol server. The method includes sending a unique identifier, such an Internet Protocol ("IP") address and a selected time-value, such as an approximate message send time-value, in a configuration file from a protocol server such as a Trivial File Protocol server ("TFTP"). A message integrity value is calculated using the unique identifier, the selected time-value and one or more configuration parameters in a pre-determined order with a cryptographic hashing function. The message integrity value is added to the configuration file. A cable modem receives the configuration file from the TFTP server and uses the message integrity value to authenticate the configuration file and determine if the configuration file was sent within a pre-determined period of time (e.g., 5 seconds) from the TFTP server. If not, the configuration is discarded by the cable modem. The unique identifier and selected time-value uniquely identify the configuration file for the cable modem and help prevent a rouge user from intercepting a valid cable modem configuration file and using it at a later time to initialize a rouge cable modem. The method and system provide improved security for initializing cable modems in a data-over-cable system.

22 Claims, 28 Drawing Sheets

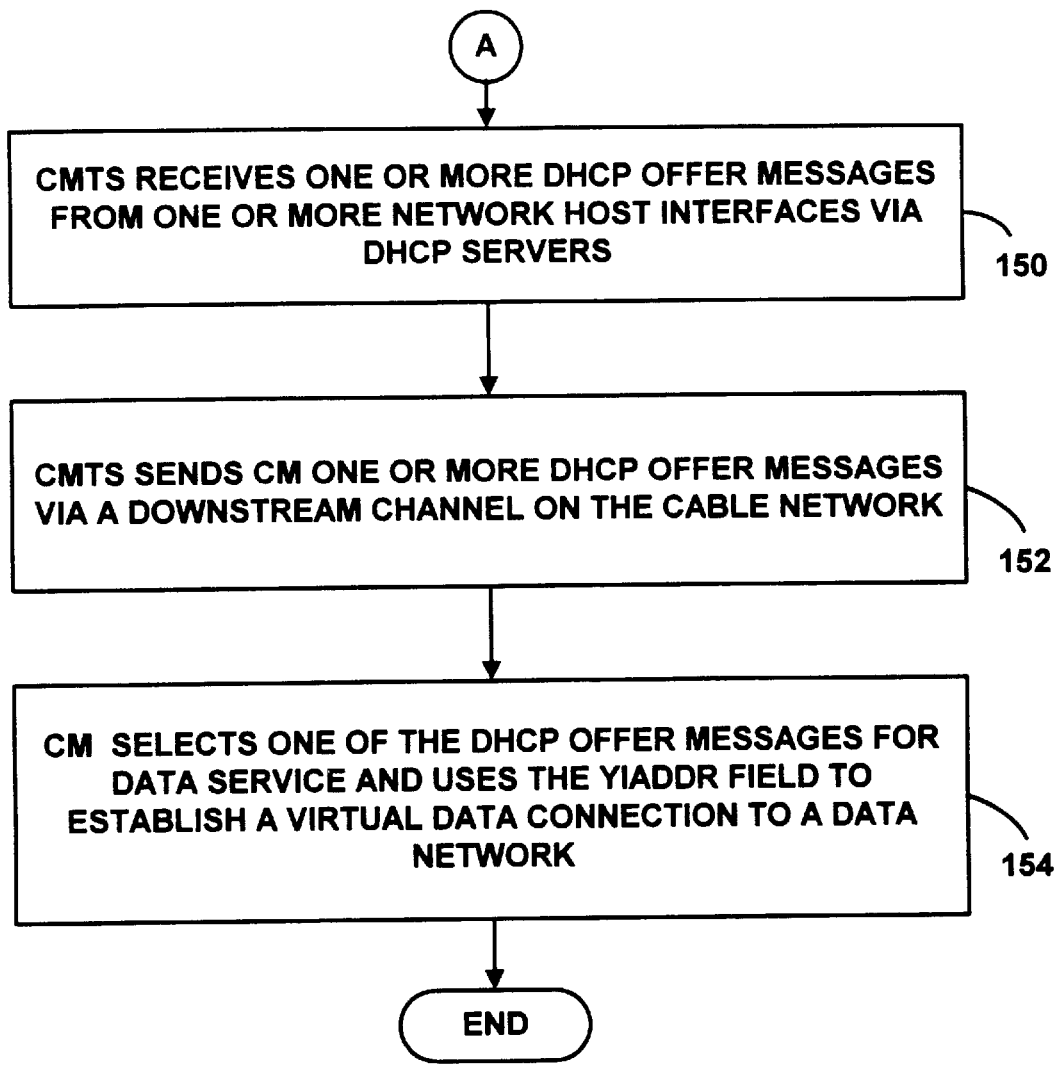

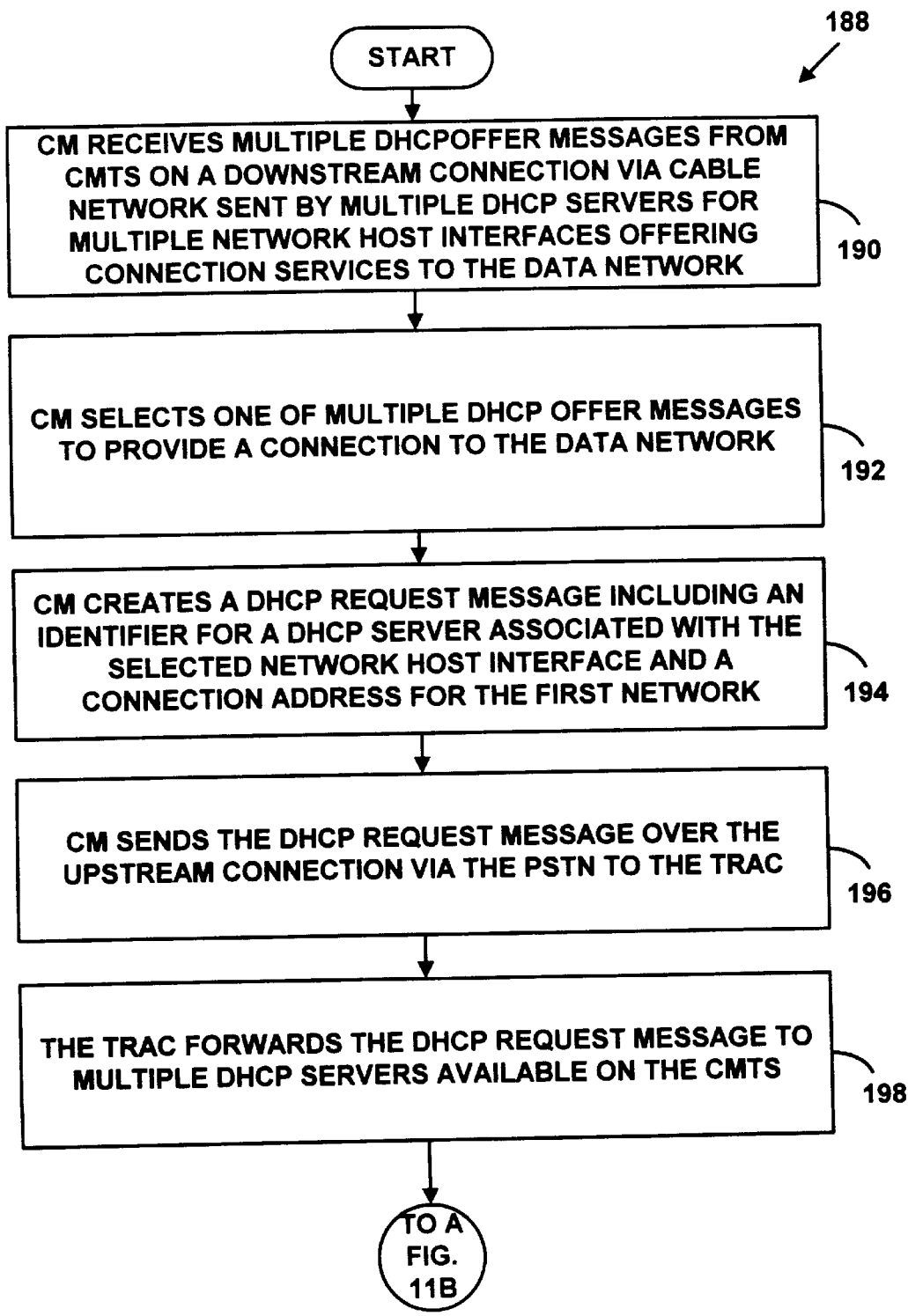

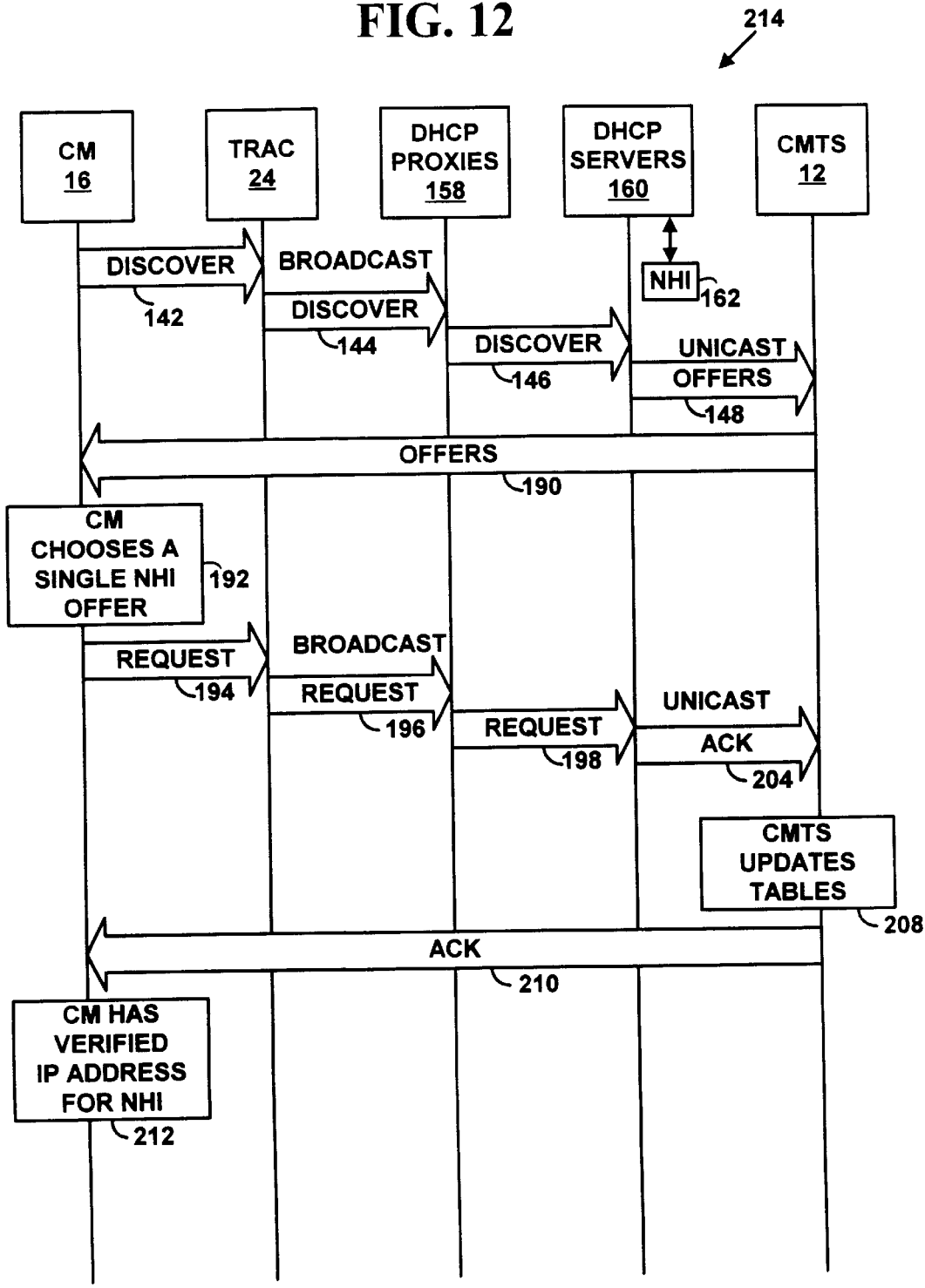

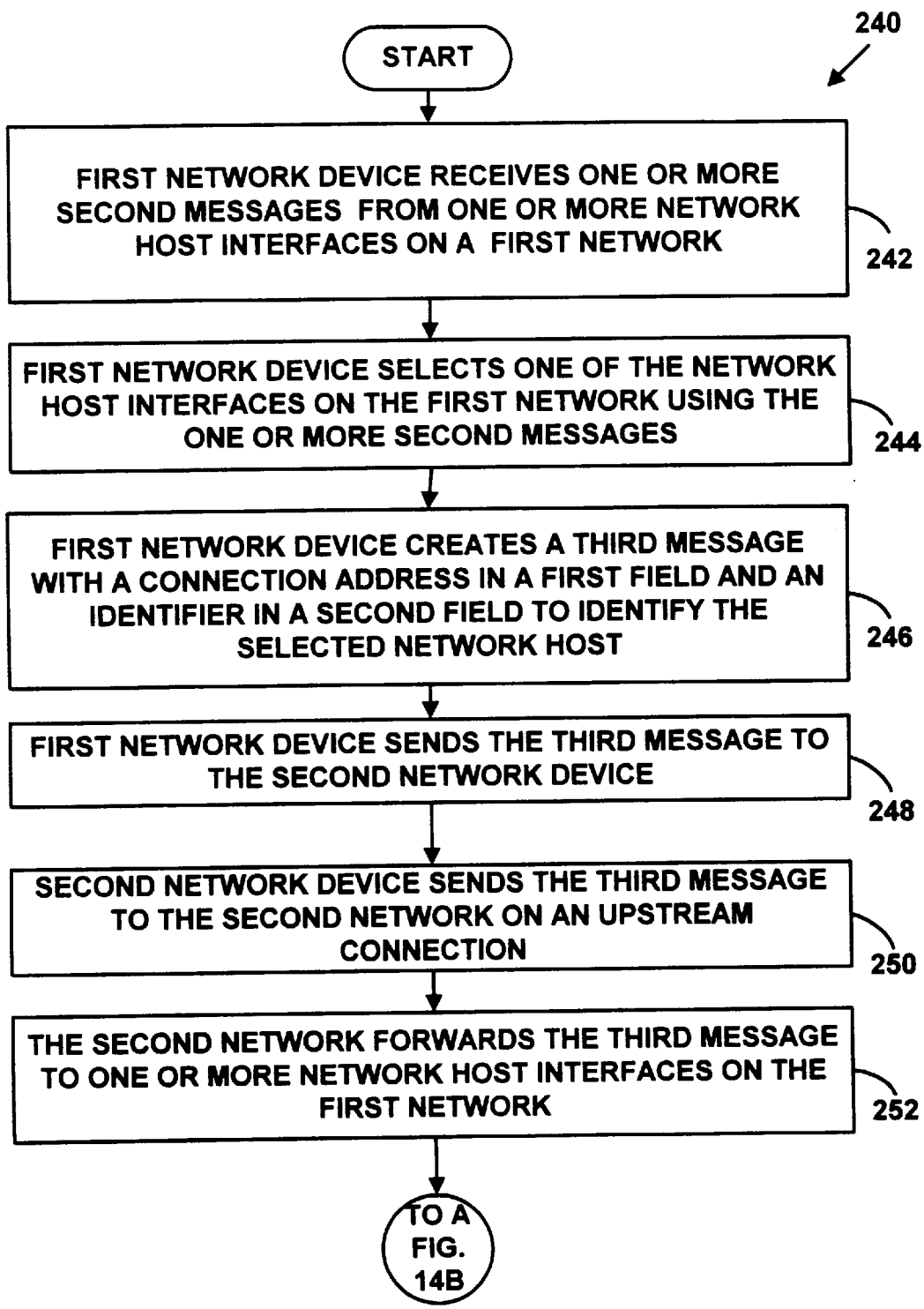

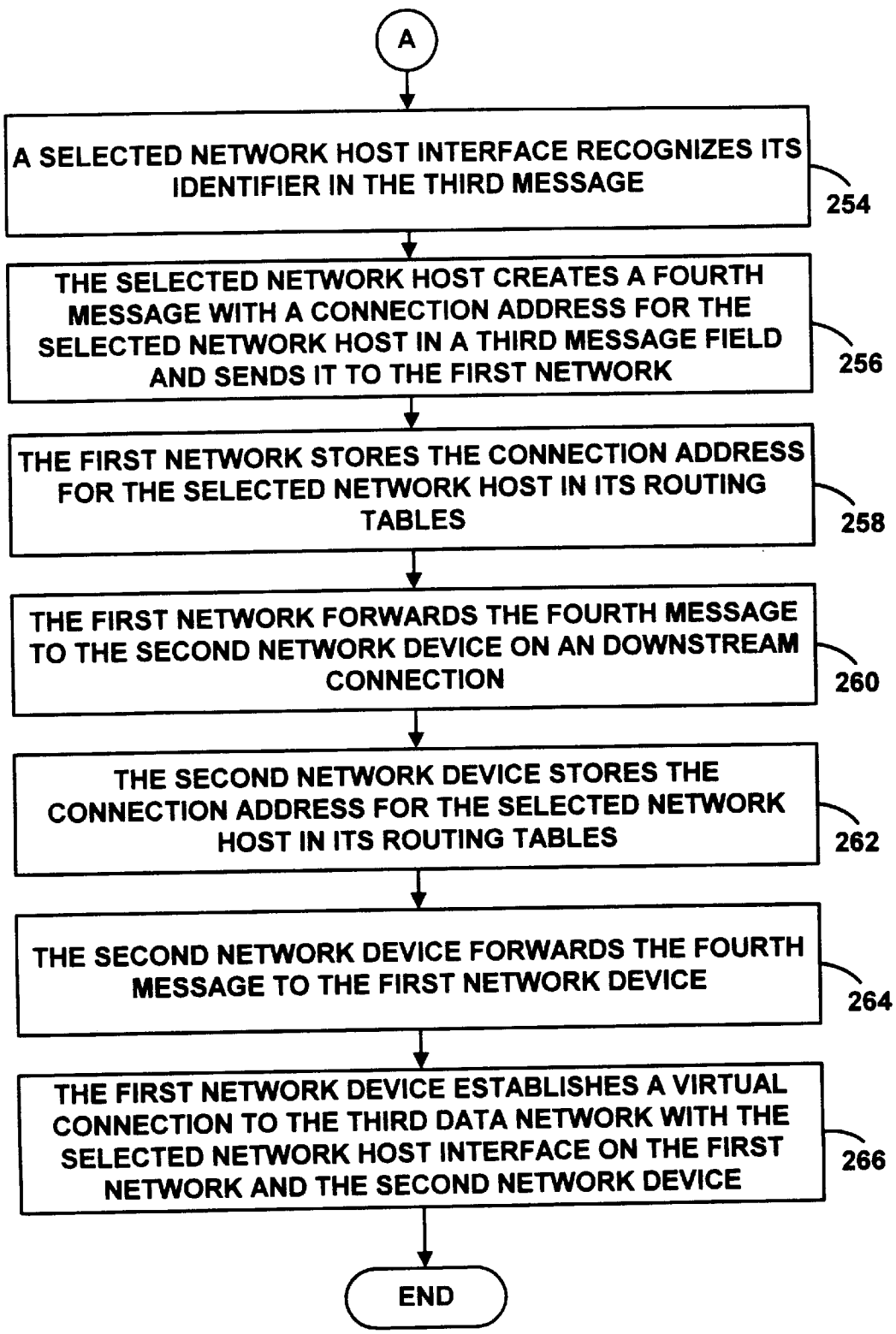

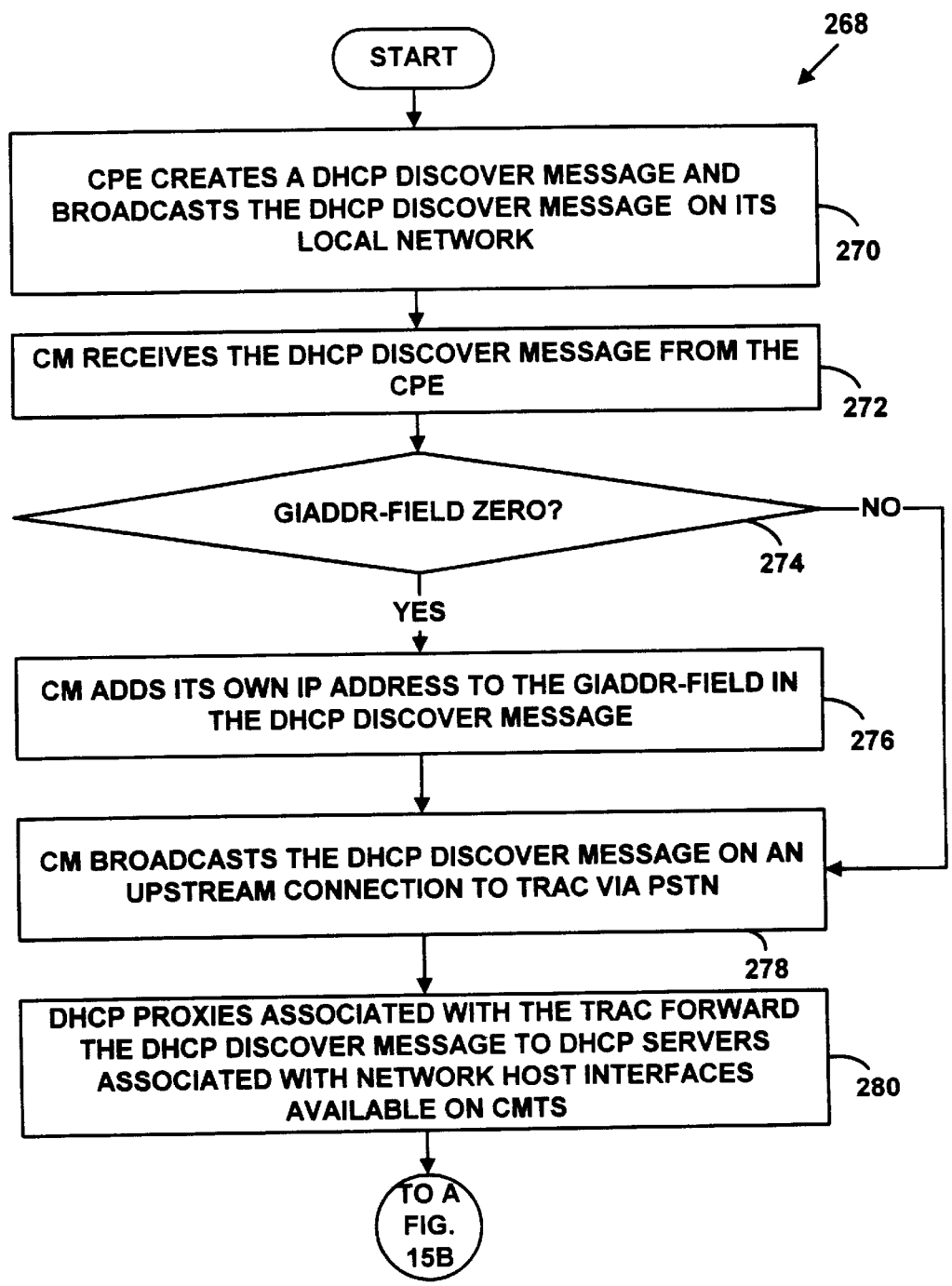

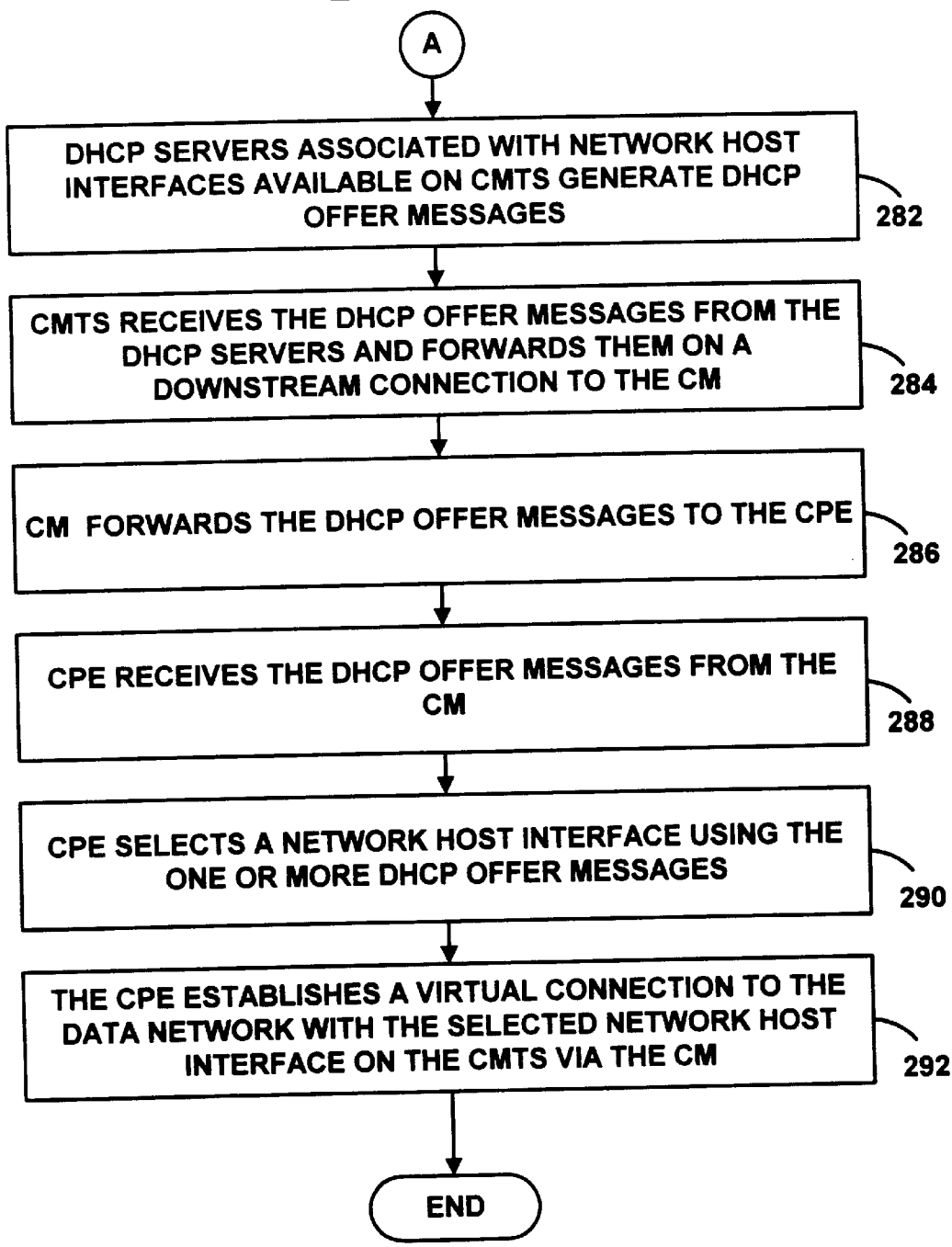

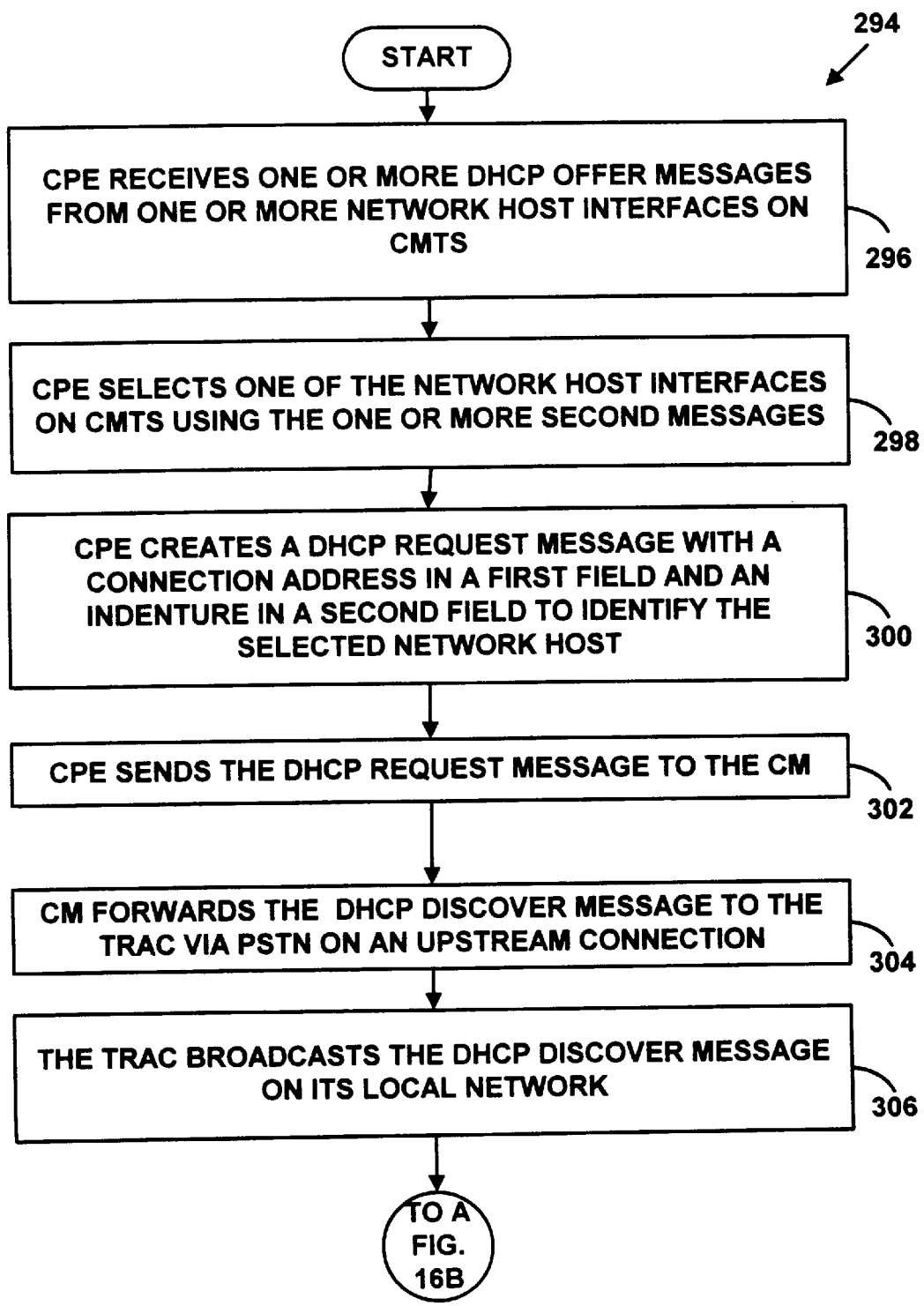

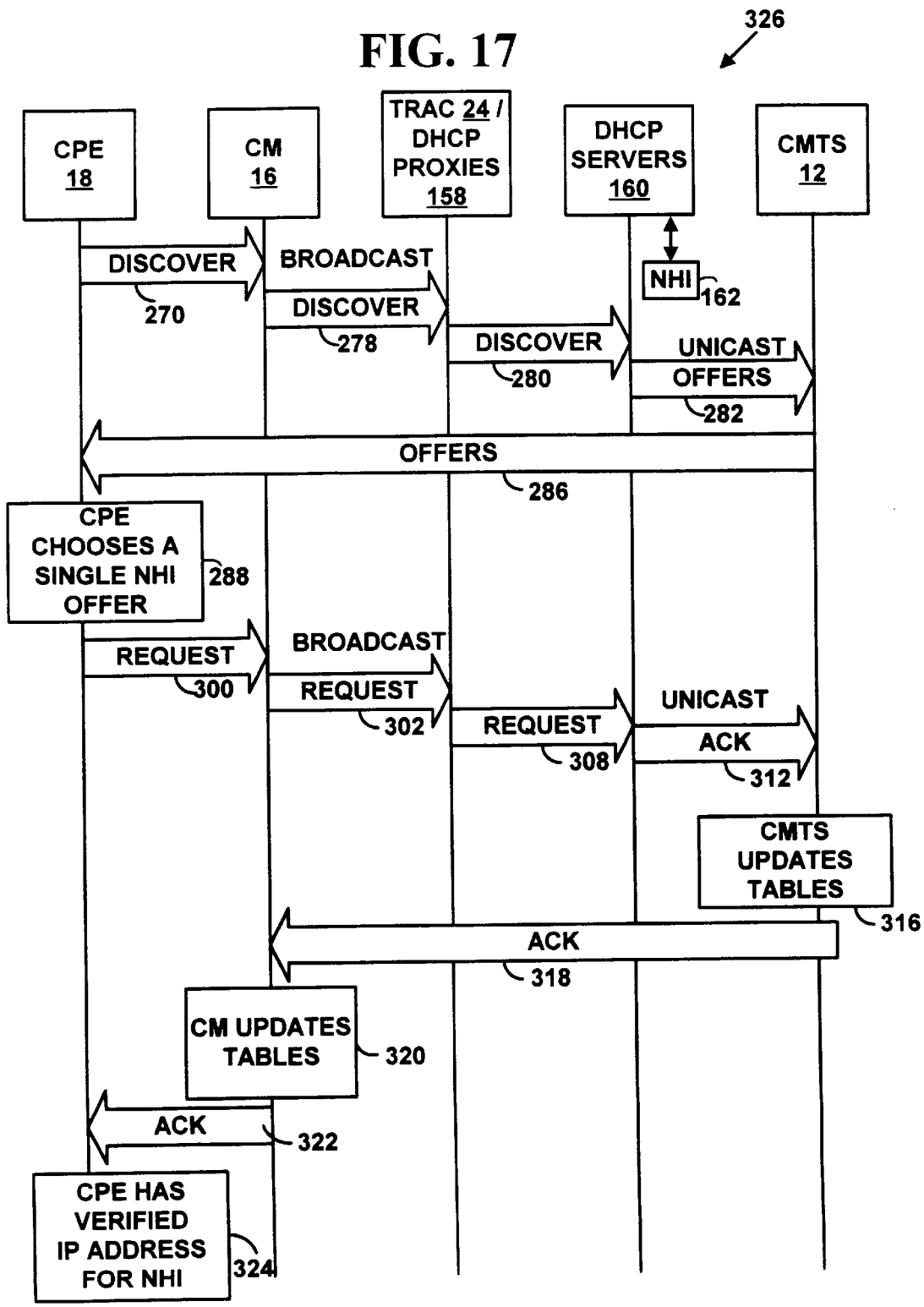

METHOD AND SYSTEM FOR SECURE CABLE MODEM INITIALIZATION

FIELD OF INVENTION

The present invention relates to communications in computer networks. More specifically, it relates to a method and system for secure cable modem initialization in a data-over-cable system.

BACKGROUND OF THE INVENTION

Cable television networks such as those provided by Comcast Cable Communications, Inc., of Philadelphia, Pa., Cox Communications of Atlanta Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to 30+ Mbps available on a coaxial cable or HFC cable system on a cable television network.

With the explosive growth of the Internet, many customers have desired to use the larger bandwidth of a cable television network to connect to the Internet and other computer networks. Cable modems, such as those provided by 3Com Corporation of Santa Clara, Calif., U.S. Robotics Corporation of Skokie, Ill., and others offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps which is a much larger data rate than can be supported by a modem used over a serial telephone line.

However, most cable television networks provide only uni-directional cable systems, supporting only a "downstream" data path. A downstream data path is the flow of data from a cable system "headend" to a customer. A cable system headend is a central location in the cable television network that is responsible for sending cable signals in the downstream direction. A return data path via a telephone network, such as a public switched telephone network provided by AT&T and others, (i.e., a "telephony return") is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system.".

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

When a cable modem used in the data-over-cable system with telephony return is initialized, a connection is made to both the cable modem termination system via the cable network and to the telephony remote access concentrator via the public switched telephone network. When a cable modem is initialized, it will initialize one or more downstream channels (i.e., downstream connections) to the cable modem termination system via the cable network or the telephony remote access concentrator via the public switched telephone network.

As part of the initialization sequence, a cable modem receives a configuration file from a protocol server (e.g., a Trivial File Transfer Protocol ("TFTP") server) with multiple configuration parameters used to configure and initialize the cable modem. The cable modem performs a number of tests on the configuration file to confirm the integrity of the configuration parameters contained in the configuration file. For example, the configuration file typically includes one or more Message Integrity Check ("MIC") fields. The MIC fields are created on the protocol server by performing a cryptographic hashing function on the configuration parameters (e.g., with Message Digest 5 ("MD5")), and sending the MIC fields with the configuration file. The cable modem verifies the integrity of the configuration file by using the same cryptographic hashing function on the configuration parameters and comparing the cryptographic hashing values to cryptographic hashing function value in the MIC fields.

There are several problems associated with sending a configuration file from a protocol server to a cable modem. A configuration file sent from a protocol server to a cable modem with one or more MIC fields is still vulnerable to malicious attacks. The configuration file can be intercepted and used by rouge cable modems to attack the data-over-cable system or obtain free services on the data-over-cable system. The MIC fields allow the integrity of the configuration file to be verified by the cable modem. However, the MIC fields do not include an identifier such as a configuration parameter for a cable modem receiving the configuration file, nor do the MIC fields identify a time period during which the configuration information can be used by the cable modem. Thus, the MIC fields, as they are presently used in the configuration file, do not prevent a malicious user from intercepting and re-using the configuration file for use by another "rouge" cable modem at another time.

For example, a rouge user could intercept a configuration file sent to a legitimate cable modem. At a later time, the rouge user uses all of the configuration information exactly as it was intercepted. The rouge user initializes the rouge cable modem using the configuration file and registers the cable modem with a cable modem termination system. Since the configuration information was used exactly as it was intercepted, when the cable modem termination system checks the MIC fields, the configuration information is verified as valid and the rouge user masquerades as a "legitimate" cable modem user thereby receiving free services or attacking the data-over-cable system.

It is therefore desirable to improve the security for transferring configuration information from protocol servers to the cable modems in a data-over-cable system so the configuration information cannot be re-used by other rouge cable modems at another time.

SUMMARY OF THE INVENTION

In accordance with an illustrative embodiment of the present invention, the problems associated with sending configuration information are overcome. A method and system for secure initialization of a network device in a data-over-cable system is provided. The method includes receiving a request for a first configuration file on a first protocol server from a first network device, the first configuration file including multiple configuration parameters. A unique identifier (e.g., a network address) for the first network device is added to the first configuration file. A selected time-value is added to the first configuration file, wherein the selected time-value indicates an approximate sending time for the first configuration file. A message integrity check value is calculated using the unique identifier, the selected time-value and one or more configuration parameters from the first configuration file in a pre-determined order to uniquely identify the configuration information for the first network device. The message integrity check value is calculated using a pre-determined cryptographic technique. The message integrity check value is added to the first configuration file. The first configuration file is sent from the first protocol server to the first network device. The first network device uses the message integrity check value including the unique identifier and selected time-value to uniquely identify the configuration information and prevent another network device from using the configuration file at a later time.

In an illustrative embodiment of the present invention, a cable modem receives a configuration file from a TFTP server. However, the invention is not limited to cable modems and TFTP servers, and other network devices and protocol servers could also be used in a data-over-cable system.

In an illustrative embodiment of the present invention, a cable modem sends a Read ReQuest message ("RRQ") to a TFTP server requesting a configuration file. The cable modem receives the name of the configuration file from a Dynamic Host Configuration Protocol ("DHCP") server during an initialization sequence. The TFTP server obtains the configuration file (e.g., from a DHCP server). The TFTP server adds an IP address for the cable modem to the configuration file. The IP address is an address obtained by the cable modem from a DHCP server during an initialization sequence and sent to the TFTP server in a TFTP RRQ message header. However, the TFTP server may also obtain the IP address from other sources (e.g., from a DHCP message). The TFTP server selects a time-value and adds it to the configuration file. The selected time-value indicates an approximate sending time of the configuration file. A message integrity check value is calculated using the IP address, the selected time-value and one or more configuration parameters in a pre-determined order to uniquely identify the configuration file for the cable modem. In one embodiment of the present invention, the message integrity check value is calculated using Message Digest 5 ("MD5"). However, other cryptographic techniques may also be used. The message integrity check value with the IP address and selected time-value is added to the configuration file. The configuration file is sent from the TFTP server to the cable modem as secure configuration information.

The cable modem uses the message integrity check value to verify the integrity of the configuration file, as well as determine a time period for which the configuration file is valid. For example, if the cable modem verifies the integrity of the configuration file but detects the selected time-value for the configuration file is different by a predetermined amount (e.g., 5 seconds) from an internal time value on the cable modem, the cable modem discards the configuration file.

The method and system of the present invention provide improved security for cable modem initialization. For a rouge user to attack a data-over-cable system, the rouge user must intercept a configuration file from the TFTP server, modify the selected time-value (or IP address), re-calculate message integrity value with a rouge time value. The configuration file must then be re-transmitted within a pre-determined time period that is used by a cable modem (e.g., 5 seconds) for checking the integrity of configuration files.

The rouge user may also have to determine the cryptographic technique being used to create the message integrity value and guess the pre-determined time period that is used by the cable modem for checking configuration files. Since the pre-determined time period that is used by the cable modem for checking registration request messages is small, the probability a rouge user can successfully attack the data-over-cable system is reduced. Thus, the security of cable modem initialization is improved.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIGS. 7A and 7B are a flow diagram illustrating a method for discovering hosts in a cable modem system;

FIG. 12 a block diagram illustrating the message flow of the method illustrated in FIG. 10;

FIGS. 14A and 14B are a flow diagram illustrating a method for resolving addresses for customer premise equipment;

FIGS. 15A and 15B are a flow diagram illustrating a method for addressing network host interfaces from customer premise equipment;

FIGS. 16A and 16B are a flow diagram illustrating a method for resolving network host interfaces from customer premise equipment;

FIG. 17 is a block diagram illustrating a message flow for the methods in FIGS. 15A, 15B, and 16A and 16B;

DETAILED DESCRIPTION OF AN ILLUSTRATIVE EMBODIMENT

Cable modem system with telephony return

Figure 1:
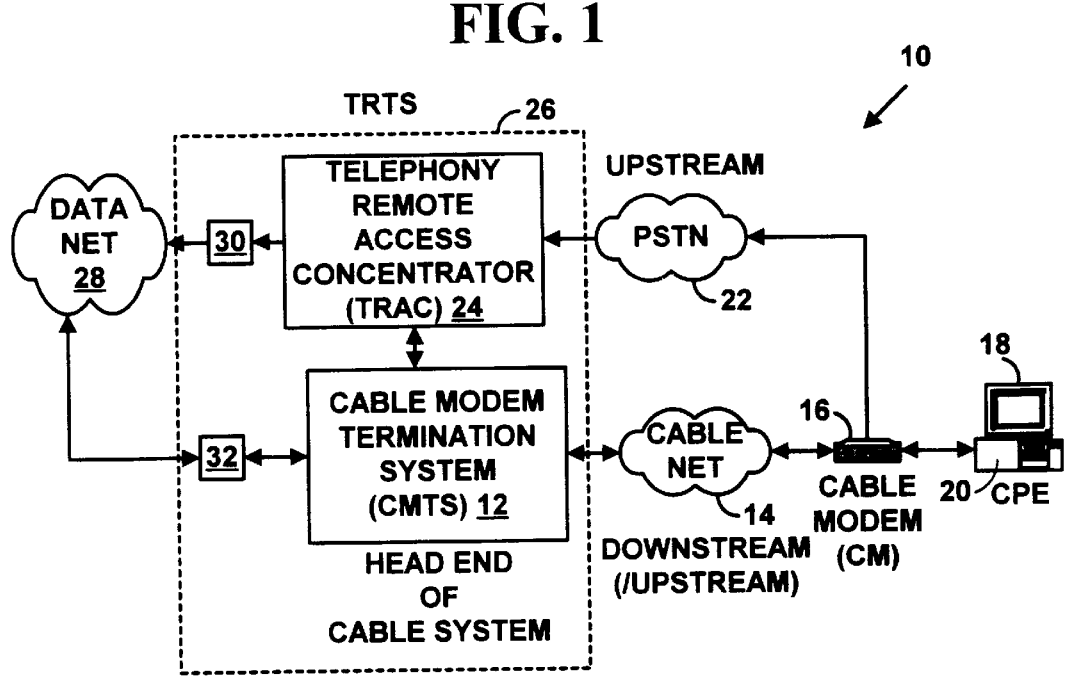
FIG. 1 is a block diagram illustrating a cable modem system with telephony return.

FIG. 1 is a block diagram illustrating a data-over-cable system with telephony return 10, hereinafter data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1 and the present invention is not limited to a data-over-cable system with telephony return. In a data-over cable system without telephony return, customer premise equipment or cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. Cable network 14 is connected to a Cable Modem ("CM") 16 with a downstream cable connection.

CM 16 is connected to Customer Premise Equipment ("CPE") 18 such as a personal computer system via a Cable Modem-to-CPE Interface ("CMC") 20. CM 16 is connected to a Public Switched Telephone Network ("PSTN") 22 with an upstream telephony connection. PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. PSTN 22 is connected to a Telephony Remote Access Concentrator ("TRAC") 24. In a data-over cable system without telephony return, CM 16 has an upstream connection to CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to CM 16. In another embodiment of the present invention, the telephony modem is a separate modem unit external to CM 16 used specifically for connecting with PSTN 22. A separate telephony modem includes a connection to CM 16 for exchanging data. CM 16 includes cable modems provided by the 3Com Corporation of Santa Clara, Calif., U.S. Robotics Corporation of Skokie, Ill., and others. In yet another embodiment of the present invention, CM 16 includes functionality to connect only to cable network 14 and receives downstream signals from cable network 14 and sends upstream signals to cable network 14 without telephony return. The present invention is not limited to cable modems used with telephony return.

CMTS 12 and TRAC 24 may be at a "headend" of cable system 10, or TRAC 24 may be located elsewhere and have routing associations to CMTS 12. CMTS 12 and TRAC 24 together are called a "Telephony Return Termination System" ("TRTS") 26. TRTS 26 is illustrated by a dashed box in FIG. 1. CMTS 12 and TRAC 24 make up TRTS 26 whether or not they are located at the headend of cable network 14, and TRAC 24 may in located in a different geographic location from CMTS 12. Content severs, operations servers, administrative servers and maintenance servers used in data-over-cable system 10 (not shown in FIG. 1) may also be in different locations. Access points to data-over-cable system 10 are connected to one or more CMTS's 12 or cable headend access points. Such configurations may be "one-to-one", "one-to-many," or "many-to-many," and may be interconnected to other Local Area Networks ("LANs") or Wide Area Networks ("WANs").

TRAC 24 is connected to a data network 28 (e.g., the Internet or an intranet) by a TRAC-Network System Interface 30 ("TRAC-NSI"). CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used.

Cable modem protocol stack

Figure 2:
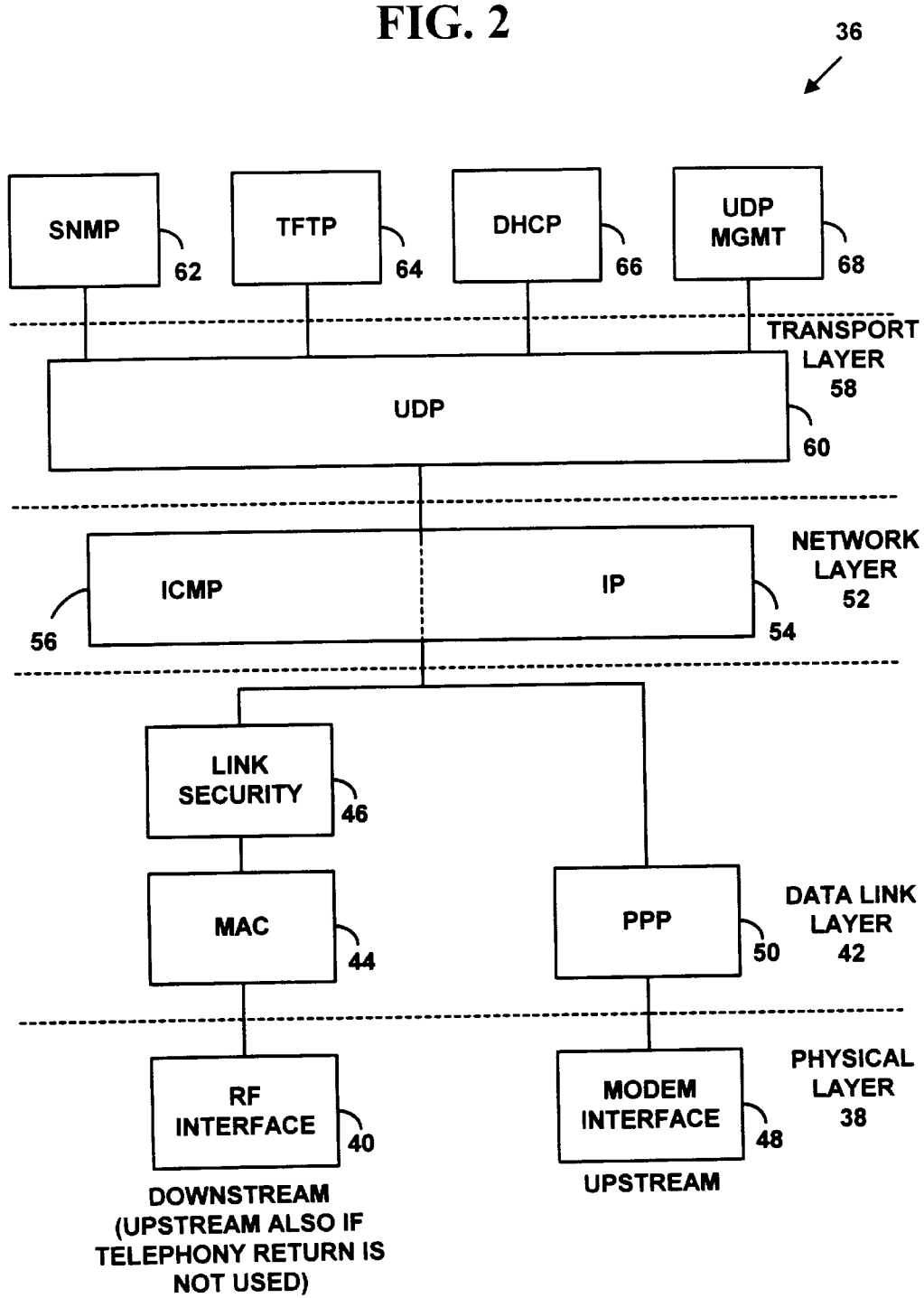
FIG. 2 is a block diagram illustrating a protocol stack for a cable modem.

FIG. 2 is a block diagram illustrating a protocol stack 36 for CM 16. FIG. 2 illustrates the downstream and upstream protocols used in CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, CM 16 is connected to cable network 14 in a physical layer 38 via a Radio Frequency ("RF") Interface 40. In an illustrative embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in RF interface 40. However, other operating frequencies modulation methods could also be used. For more information on RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others can be used).

Above RF interface 40 in a data-link layer 42 is a Medium Access Control ("MAC") layer 44. As is known in the art, MAC layer 44 controls access to a transmission medium via physical layer 38. For more information on MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above MAC layer 44 is an optional link security protocol stack 46. Link security protocol stack 46 prevents authorized users from making a data connection from cable network 14. RF interface 40 and MAC layer 44 can also be used for an upstream connection if data-over-cable system 10 is used without telephony return.

For upstream data transmission with telephony return, CM 16 is connected to PSTN 22 in physical layer 38 via modem interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as modem interface 48. As is known in the art, ITU-T V.34 is commonly used in the data link layer for modem communications and currently allows data rates as high as 33,600 bits-per-second ("bps"). For more information see the ITU-T V.34 standard. However, other modem interfaces or other telephony interfaces could also be used.

Above modem interface 48 in data link layer 42 is Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see RFC-791 incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP see RFC-971 incorporated herein by reference.

Above IP 54 and ICMP 56 is a transport layer 58 with User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see RFC-768 incorporated herein by reference.

Above the network layer are a Simple Network Management Protocol ("SNMP") layer 62, Trivial File Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157 incorporated herein by reference. TFTP layer 64 is a file transfer protocol used to download files and configuration information. For more information on TFTP layer 64 see RFC-1350 incorporated herein by reference. DHCP layer 66 is a protocol for passing configuration information to hosts on an IP 54 network. For more information on DHCP layer 66 see RFC-1541 incorporated herein by reference. UDP manager 68 distinguishes and routes packets to an appropriate service (e.g., a virtual tunnel). More or few protocol layers could also be used with data-over-cable system 10.

CM 16 supports transmission and reception of IP 54 datagrams as specified by RFC-791. CMTS 12 and TRAC 24 may perform filtering of IP 54 datagrams. CM 16 is configurable for IP 54 datagram filtering to restrict CM 16 and CPE 18 to the use of only their assigned IP 54 addresses. CM 16 is configurable for IP 54 datagram UDP 60 port filtering (i.e., deep filtering).

CM 16 forwards IP 54 datagrams destined to an IP 54 unicast address across cable network 14 or PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between TRAC 24 and CMTS 12 which preclude filtering, or various forms of virtual tunneling and reverse virtual tunneling could be used to virtually source upstream packets from CM 16. For more information on virtual tunneling see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

CM 16 also forwards IP 54 datagrams destined to an IP 54 multicast address across cable network 14 or PSTN 22. CM 16 is configurable to keep IP 54 multicast routing tables and to use group membership protocols. CM 16 is also capable of IP 54 tunneling upstream through the telephony path. A CM 16 that wants to send a multicast packet across a virtual tunnel will prepend another IP 54 header, set the destination address in the new header to be the unicast address of CMTS 12 at the other end of the tunnel, and set the IP 54 protocol field to be four, which means the next protocol is IP 54.

CMTS 12 at the other end of the virtual tunnel receives the packet, strips off the encapsulating IP 54 header, and forwards the packet as appropriate. A broadcast IP 54 capability is dependent upon the configuration of the direct linkage, if any, between TRAC 24 and CMTS 12. CMTS 12, CM 16, and TRAC 24 are capable of routing IP 54 datagrams destined to an IP 54 broadcast address which is across cable network 14 or PSTN 22 if so configured. CM 16 is configurable for IP 54 broadcast datagram filtering.

An operating environment for CM 16 of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a cable modem with telephony return

Figure 3:
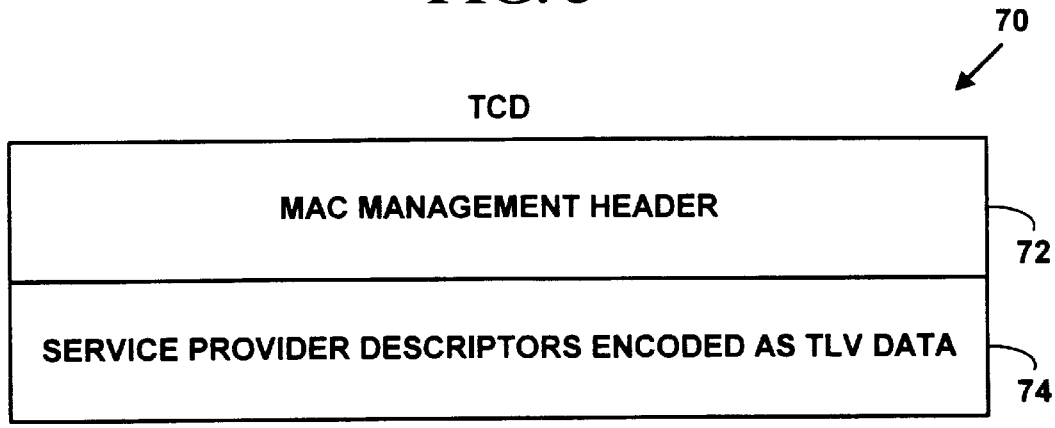
FIG. 3 is a block diagram illustrating a Telephony Channel Descriptor message structure.

When CM 16 is initially powered on, if telephony return is being used, CM 16 will receive a Telephony Channel Descriptor ("TCD") from CMTS 12 that is used to provide dialing and access instructions on downstream channels via cable network 14. Information in the TCD is used by CM 16 to connect to TRAC 24. The TCD is transmitted as a MAC management message with a management type value of TRI_TCD at a periodic interval (e.g., every 2 seconds). To provide for flexibility, the TCD message parameters are encoded in a Type/Length/Value ("TLV") form. However, other encoding techniques could also be used. FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by CM 16 to initiate a telephone call. SPD 74 is a TLV-encoded data structure that contains sets of dialing and access parameters for CM 16 with telephony return. SPD 74 is contained within TCD message 70. There may be multiple SPD 74 encodings within a single TCD message 70. There is at least one SPD 74 in TCD message 70. SPD 74 parameters are encoded as SPD-TLV tuples. SPD 74 contains the parameters shown in Table 1 and may contain optional vendor specific parameters. However, more or fewer parameters could also be used in SPD 74.

TABLE 1

| SPD 74 Parameter | Description |
|---|---|
| Factory Default Flag | Boolean value, if TRUE(1), indicates a SPD which should be used by CM 16. |
| Service Provider Name | This parameter includes the name of a service provider. Format is standard ASCII string composed of numbers and letters. |
| Telephone Numbers | These parameters contain telephone numbers that CM 16 uses to initiate a telephony modem link during a login process. Connections are attempted in ascending numeric order (i.e., Phone Number 1, Phone Number 2 . . . ). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name CM 16 will use an authentication protocol over the telephone link during the initialization procedure. Format is a monolithic sequence of alphanumeric characters in an ASCII string composed of numbers and letters. |
| Login Password | This contains a password that CM 16 will use during authentication over a telephone link during the initialization procedure. Format is a monolithic sequence of alphanumeric characters in an ASCII string composed of numbers and letters. |
| DHCP Authenticate | Boolean value, reserved to indicate that CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP Server | IP 54 address value of a DHCP 66 Server CM 16 uses for DHCP 66 Client and BOOTP Relay Process. If this attribute is present and DHCP 66 Authenticate attribute is TRUE(1). The default value is integer zero. |
| RADIUS Realm | The realm name is a string that defines a RADIUS server domain. Format is a monolithic sequence of alphanumeric characters in an ACSII string composed of numbers and letters. |
| PPP Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by CMTS 12 at periodic intervals (e.g., every 2 seconds) to report CMTS 12 information to CM 16 whether or not telephony return is used. The TSI message is transmitted as a MAC 44 management message. The TSI provides a CMTS 12 boot record in a downstream channel to CM 16 via cable network 14. Information in the TSI is used by CM 16 to obtain information about the status of CMTS 12. The TSI message has a MAC 44 management type value of TRI_TSI.

Figure 4:
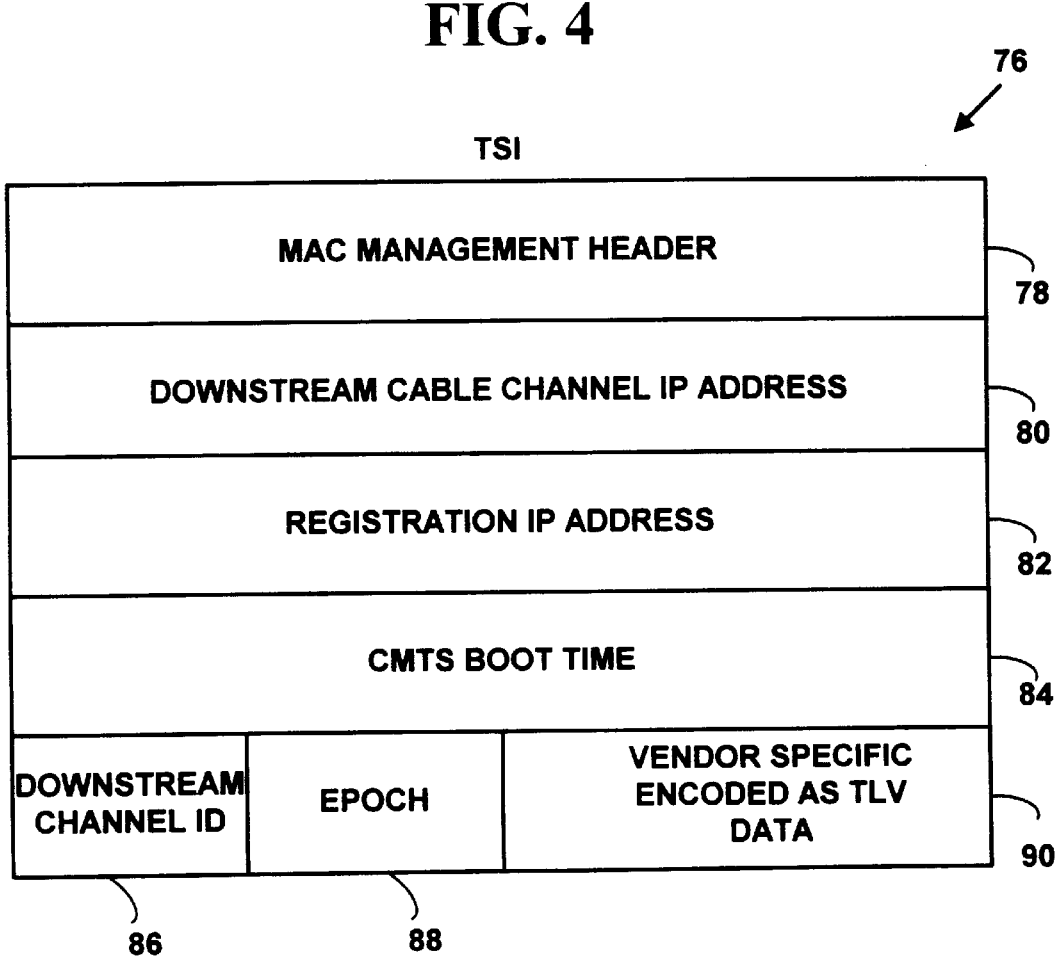
FIG. 4 is a block diagram illustrating a Termination System Information message structure.

FIG. 4 is a block diagram of a TSI message structure 76. TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
| --- | --- |
| Downstream Channel IP Address 80 | This field contains an IP 54 address of CMTS 12 available on the downstream channel this message arrived on. |
| Registration IP Address 82 | This field contains an IP 54 address CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time CMTS 12 is either re-initialized or performs address or routing table flush. |
| Vendor Specific Extensions 90 | Optional vendor extensions may be added as TLV encoded data. |

After receiving TCD 70 message and TSI message 76, CM 16 continues to establish access to data network 28 (and resources on the network) by first dialing into TRAC 24 and establishing a telephony PPP 50 session. Upon the completion of a successful PPP 50 connection, CM 16 performs PPP Link Control Protocol ("LCP") negotiation with TRAC 24. Once LCP negotiation is complete, CM 16 requests Internet Protocol Control Protocol ("IPCP") address negotiation. For more information on IPCP see RFC-1332 incorporated herein by reference. During IPCP negotiation, CM 16 negotiates an IP 54 address with TRAC 24 for sending IP 54 data packet responses back to data network 28 via TRAC 24.

When CM 16 has established an IP 54 link to TRAC 24, it begins "upstream" communications to CMTS 12 via DHCP layer 66 to complete a virtual data connection by attempting to discover network host interfaces available on CMTS 12 (e.g., IP 54 host interfaces for a virtual IP 54 connection). The virtual data connection allows CM 16 to receive data from data network 28 via CMTS 12 and cable network 14, and send return data to data network 28 via TRAC 24 and PSTN 22. CM 16 must first determine an address of a host interface (e.g., an IP 54 interface) available on CMTS 12 that can be used by data network 28 to send data to CM 16. However, CM 16 has only a downstream connection from CMTS 12 and has to obtain a connection address to data network 28 using an upstream connection to TRAC 24.

Figure 5:
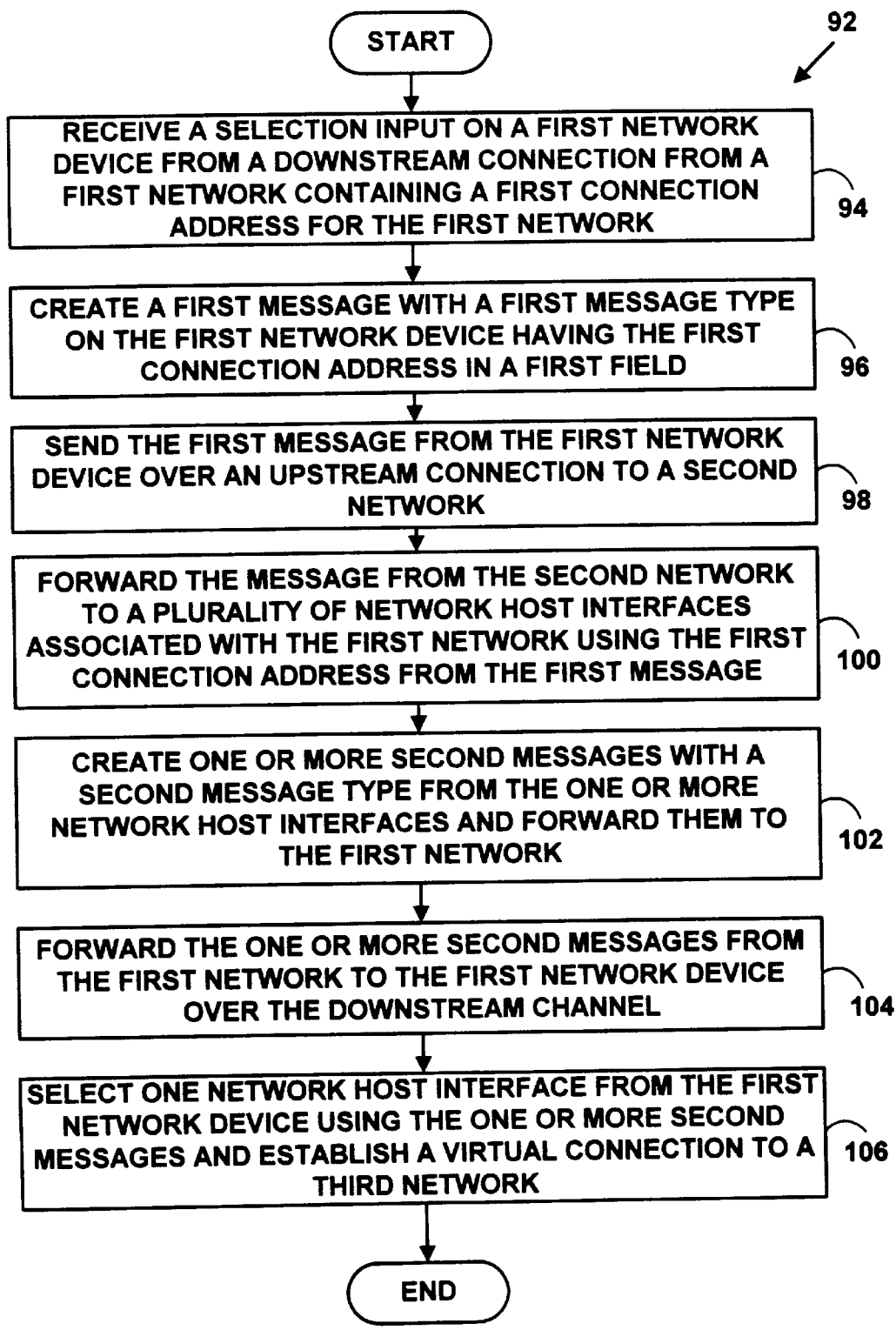
FIG. 5 is a flow diagram illustrating a method for addressing hosts in a cable modem system.

Addressing network host interfaces in the data-over-cable system via the cable modem FIG. 5 is a flow diagram illustrating a method 92 for addressing network host interfaces in a data-over-cable system with telephony return via a cable modem. Method 92 allows a cable modem to establish a virtual data connection to a data network. In method 92, multiple network devices are connected to a first network with a downstream connection of a first connection type, and connected to a second network with an upstream connection of a second connection type. The first and second networks are connected to a third network with a third connection type.

At step 94, a selection input is received on a first network device from the first network over the downstream connection. The selection input includes a first connection address allowing the first network device to communicate with the first network via upstream connection to the second network. At step 96, a first message of a first type for a first protocol is created on the first network device having the first connection address from the selection input in a first message field. The first message is used to request a network host interface address on the first network. The first connection address allows the first network device to have the first message with the first message type forwarded to network host interfaces available on the first network via the upstream connection to the second network.

At step 98, the first network device sends the first message over the upstream connection to the second network. The second network uses the first address field in the first message to forward the first message to one or more network host interfaces available on first network at step 100. Network host interfaces available on the first network that can provide the services requested in first message send a second message with a second message type with a second connection address in a second message field to the first network at step 102. The second connection address allows the first network device to receive data packets from the third network via a network host interface available on the first network. The first network forwards one or more second messages on the downstream connection to the first network device at step 104.

The first network device selects a second connection address from one of the second messages from one of the one or more network host interfaces available on the first network at step 106 and establishes a virtual connection from the third network to the first network device using the second connection address for the selected network host interface.

The virtual connection includes receiving data on the first network host interface on the first network from the third network and sending the data over the downstream connection to the first network device. The first network device sends data responses back to the third network over the upstream connection to the second network, which forwards the data to the appropriate destination on the third network.

In one embodiment of the present invention, the data-over-cable system is data-over-cable system 10, the first network device is CM 16, the first network is cable television network 14, the downstream connection is a cable television connection. The second network is PSTN 22, the upstream connection is a telephony connection, the third network is data network 28 (e.g., the Internet or an intranet) and the third type of connection is an IP 54 connection. The first and second connection addresses are IP 54 addresses. However, the present invention is not limited to the network components and addresses described. Method 92 allows CM 16 to determine an IP 54 network host interface address available on CMTS 12 to receive IP 54 data packets from data network 28, thereby establishing a virtual IP 54 connection with data network 28.

After addressing network host interfaces using method 92, an exemplary data path through cable system 10 is illustrated in Table 3. However other data paths could also be used and the present invention is not limited to the data paths shown in Table 3. For example, CM 16 may send data upstream back through cable network 14 (e.g., CM 16 to cable network 14 to CMTS 12) and not use PSTN 22 and the telephony return upstream path.

TABLE 3

1. An IP 54 datagram from data network 28 destined for CM 16 arrives on CMTS-NSI 32 and enters CMTS 12.
2. CMTS 12 encodes the IP 54 datagram in a cable data frame, passes it to MAC 44 and transmits it "downstream" to RF interface 40 on CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with modem interface 48 via PSTN 22 to TRAC 24.
5. TRAC 24 decodes the IP 54 datagram and forwards it via TRAC-NSI 30 to a destination on data network 28.

Dynamic network host configuration on data-over-cable system

As was illustrated in FIG. 2, CM 16 includes a Dynamic Host Configuration Protocol ("DHCP") layer 66, hereinafter DHCP 66. DHCP 66 is used to provide configuration parameters to hosts on a network (e.g., an IP 54 network). DHCP 66 consists of two components: a protocol for delivering host-specific configuration parameters from a DHCP 66 server to a host and a mechanism for allocation of network host addresses to hosts. DHCP 66 is built on a client-server model, where designated DHCP 66 servers allocate network host addresses and deliver configuration parameters to dynamically configured network host clients.

Figure 6:
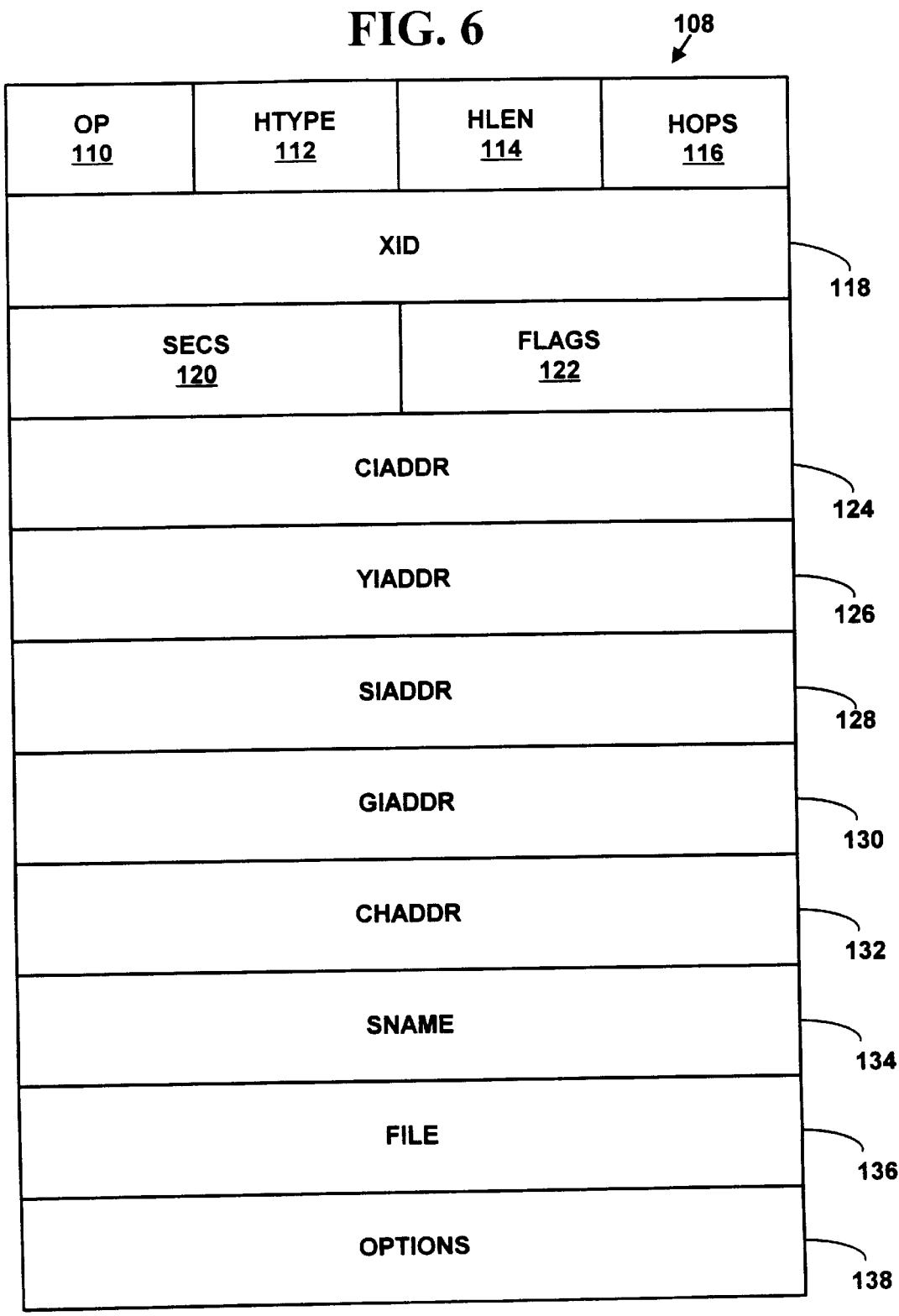
FIG. 6 is a block diagram illustrating a Dynamic Host Configuration Protocol message structure.

FIG. 6 is a block diagram illustrating a DHCP 66 message structure 108. The format of DHCP 66 messages is based on the format of BOOTstrap Protocol ("BOOTP") messages described in RFC-951 and RFC-1542 incorporated herein by reference. From a network host client's point of view, DHCP 66 is an extension of the BOOTP mechanism. This behavior allows existing BOOTP clients to interoperate with DHCP 66 servers without requiring any change to network host the clients' BOOTP initialization software. DHCP 66 provides persistent storage of network parameters for network host clients.

To capture BOOTP relay agent behavior described as part of the BOOTP specification and to allow interoperability of existing BOOTP clients with DHCP 66 servers, DHCP 66 uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for DHCP 66 message 108 fields are shown in Table 4.

TABLE 4

| DCHP 66 Parameter | Description |
| --- | --- |
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your'(client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 6 is used to discover IP 54 and other network host interfaces in data-over-cable system 10. A network host client (e.g., CM 16) uses DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCP 66 discover message on its local physical subnet. The DHCP 66 discover message may include options that suggest values for a network host interface address. BOOTP relay agents may pass the message on to DHCP 66 servers not on the same physical subnet.
2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering network host interfaces in the data-over-cable system

The DHCP discovery process illustrated in table 5 will not work in data-over-cable system 10. CM 16 has only a downstream connection from CMTS 12, which includes DHCP 66 servers, associated with network host interfaces available on CMTS 12. In an illustrative embodiment of the present invention, CM 16 discovers network host interfaces via TRAC 24 and PSTN 22 on an upstream connection.

The DHCP 66 addressing process shown in Table 5 was not originally intended to discover network host interfaces in data-over-cable system 10. CMTS 12 has DHCP 66 servers associated with network host interfaces (e.g., IP interfaces), but CM 16 only has as downstream connection from CMTS 12. CM 16 has an upstream connection to TRAC 24, which has a DHCP 66 layer. However, TRAC 24 does not have DHCP 66 servers, or direct access to network host interfaces on CMTS 12.

Figure 7A:
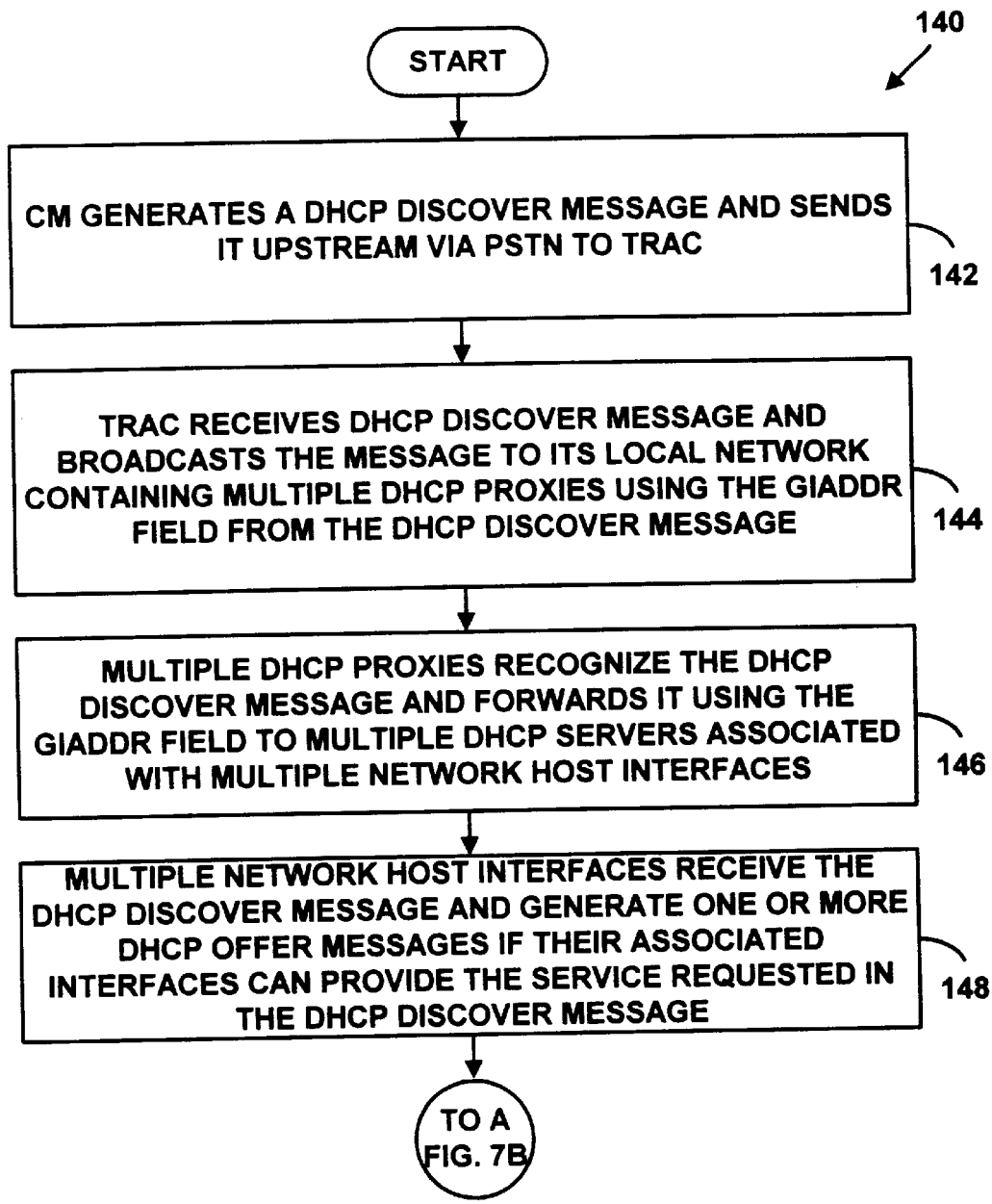

FIGS. 7A and 7B are a flow diagram illustrating a method 140 for discovering network host interfaces in data-over-cable system 10. When CM 16 has established an IP 54 link to TRAC 24, it begins communications with CMTS 12 via DHCP 66 to complete a virtual IP 54 connection with data network 28. However, to discover what IP 54 host interfaces might be available on CMTS 12, CM 16 has to communicate with CMTS 12 via PSTN 22 and TRAC 24 since CM 16 only has a "downstream" cable channel from CMTS 12.

At step 142 in FIG. 7A, after receiving a TSI message 76 from CMTS 12 on a downstream connection, CM 16 generates a DHCP discover ("DHCPDISCOVER") message and sends it upstream via PSTN 22 to TRAC 22 to discover what IP 54 interfaces are available on CMTS 12. The fields of the DHCP discover message are set as illustrated in Table 6. However, other field settings may also be used.

TABLE 6

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 118 | Set BROADCAST bit to zero. |
| CIADDR 124 | If CM 16 has previously been assigned an IP 54 address, the IP 54 address is placed in this field. If CM 16 has previously been assigned an IP 54 address by DHCP 66, and also has been assigned an address via IPCP, CM 16 places the DHCP 66 IP 54 address in this field. |
| GIADDR 130 | CM 16 places the Downstream Channel IP 54 address 80 of CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more IP 54 host interfaces available on CMTS 12. DHCP 66 giaddr-field 130 (FIG. 6) includes the downstream channel IP address 80 of CMTS 12 obtained in TSI message 76 (e.g., the first message field from step 96 of method 92). Using the downstream channel IP address 80 of CMTS 12 obtained in TSI message 76 allows the DHCP-DISCOVER message to be forwarded by TRAC 24 to DHCP 66 servers (i.e., protocol servers) associated with network host interfaces available on CMTS 12. If DHCP 66 giaddr-field 130 (FIG. 6) in a DHCP message from a DHCP 66 client is non-zero, the DHCP 66 server sends any return messages to a DHCP 66 server port on a DHCP 66 relaying agent (e.g., CMTS 12) whose address appears in DHCP 66 giaddr-field 130.

In a typical DHCP 66 discovery process the DHCP 66 giaddr-field 130 is set to zero. If DHCP 66 giaddr-field 130 is zero, the DHCP 66 client is on the same subnet as the DHCP 66 server, and the DHCP 66 server sends any return messages to either the DHCP 66 client's network address, if that address was supplied in DHCP 66 ciaddr-field 124 (FIG. 6), or to a client's hardware address specified in DHCP 66 chaddr-field 132 (FIG. 6) or to a local subnet broadcast address (e.g., 255.255.255.255).

At step 144, a DHCP 66 layer on TRAC 24 broadcasts the DHCPDISCOVER message on its local network leaving DHCP 66 giaddr-field 130 intact since it already contains a non-zero value. TRAC's 24 local network includes connections to one or more DHCP 66 proxies (i.e., network host interface proxies). The DHCP 66 proxies accept DHCP 66 messages originally from CM 16 destined for DHCP 66 servers connected to network host interfaces available on CMTS 12 since TRAC 24 has no direct access to DCHP 66 servers associated with network host interfaces available on CMTS 12. DHCP 66 proxies are not used in a typical DHCP 66 discovery process.

One or more DHCP 66 proxies on TRAC's 24 local network recognizes the DHCPDISCOVER message and forwards it to one or more DHCP 66 servers associated with network host interfaces (e.g., IP 54 interfaces) available on CMTS 12 at step 146. Since DHCP 66 giaddr-field 130 (FIG. 6) in the DHCPDISCOVER message sent by CM 16 is already non-zero (i.e., contains the downstream IP address of CMTS 12), the DHCP 66 proxies also leave DHCP 66 giaddr-field 130 intact.

One or more DHCP 66 servers for network host interfaces (e.g., IP 54 interfaces) available on CMTS 12 receive the DHCPDISCOVER message and generate a DHCP 66 offer message ("DHCPOFFER") at step 148. The DHCP 66 offer message is an offer of configuration parameters sent from network host interfaces to DHCP 66 servers and back to a network host client (e.g., CM 16) in response to a DHCP-DISCOVER message. The DHCP 66 offer message is sent with the message fields set as illustrated in Table 7. However, other field settings can also be used. DHCP 66 yiaddr-field 126 (e.g., second message field from step 102 of method 92) contains an IP 54 address for a network host interface available on CMTS 12 and used for receiving data packets from data network 28.

TABLE 7

| DHCP 66 Parameter | Description |
| --- | --- |
| FLAGS 122 | BROADCAST bit set to zero. |
| YIADDR 126 | IP 54 address from a network host interface to allow CM 16 to receive data from data network 28 via a network host interface available on CMTS 12. |
| SIADDR 128 | An IP 54 address for a TFTP 64 server to download configuration information for an interface host. |
| CHADDR 132 | MAC 44 address of CM 16. |
| SNAME 134 | Optional DHCP 66 server identifier with an interface host. |
| FILE 136 | A TFTP 64 configuration file name for CM 16. |

DHCP 66 servers send the DHCPOFFER message to the address specified in 66 giaddr-field 130 (i.e., CMTS 12)

from the DHCPDISCOVER message if associated network host interfaces (e.g., IP 54 interfaces) can offer the requested service (e.g., IP 54 service) to CM 16. The DHCPDISOVER message DHCP 66 giaddr-field 130 contains a downstream channel IP address 80 of CMTS 12 that was received by CM 16 in TSI message 76. This allows CMTS 12 to receive the DHCPOFFER messages from the DHCP 66 servers and send them to CM 16 via a downstream channel on cable network 14.

At step 150 in FIG. 7B, CMTS 12 receives one or more DHCPOFFER messages from one or more DHCP 66 servers associated with the network host interfaces (e.g., IP 54 interfaces). CMTS 12 examines DHCP 66 yiaddr-field 126 and DHCP 66 chaddr-field 132 in the DHCPOFFER messages and sends the DHCPOFFER messages to CM 16 via cable network 14. DHCP 66 yiaddr-field 126 contains an IP 54 address for a network host IP 54 interface available on CMTS 12 and used for receiving IP 54 data packets from data network 28. DHCP 66 chaddr-field 132 contains the MAC 44 layer address for CM 16 on a downstream cable channel from CMTS 12 via cable network 14. CMTS 12 knows the location of CM 16 since it sent CM 16 a MAC 44 layer address in one or more initialization messages (e.g., TSI message 76).

If a BROADCAST bit in flags field 124 is set to one, CMTS 12 sends the DHCPOFFER messages to a broadcast IP 54 address (e.g., 255.255.255.255) instead of the address specified in DHCP 66 yiaddr-field 126. DHCP 66 chaddr-field 132 is still used to determine that MAC 44 layer address. If the BROADCAST bit in DHCP 66 flags field 122 is set, CMTS 12 does not update internal address or routing tables based upon DHCP 66 yiaddr-field 126 and DHCP 66 chaddr-field 132 pair when a broadcast message is sent.

At step 152, CM 16 receives one or more DHCPOFFER messages from CMTS 12 via cable network 14 on a downstream connection. At step 154, CM 16 selects an offer for IP 54 service from one of the network host interfaces (e.g., an IP interfaces 54) available on CMTS 12 that responded to the DHCPDISOVER message sent at step 142 in FIG. 7A and establishes a virtual IP 54 connection. The selected DHCPOFFER message contains a network host interface address (e.g., IP 54 address) in DHCP 66 yiaddr-field 126 (FIG. 6). A cable modem acknowledges the selected network host interface with DHCP 66 message sequence explained below.

After selecting and acknowledging a network host interface, CM 16 has discovered an IP 54 interface address available on CMTS 12 for completing a virtual IP 54 connection with data network 28. Acknowledging a network host interface is explained below. The virtual IP 54 connection allows IP 54 data from data network 28 to be sent to CMTS 12 which forwards the IP 54 packets to CM 16 on a downstream channel via cable network 14. CM 16 sends response IP 54 packets back to data network 28 via PSTN 22 and TRAC 24.

Figure 8:
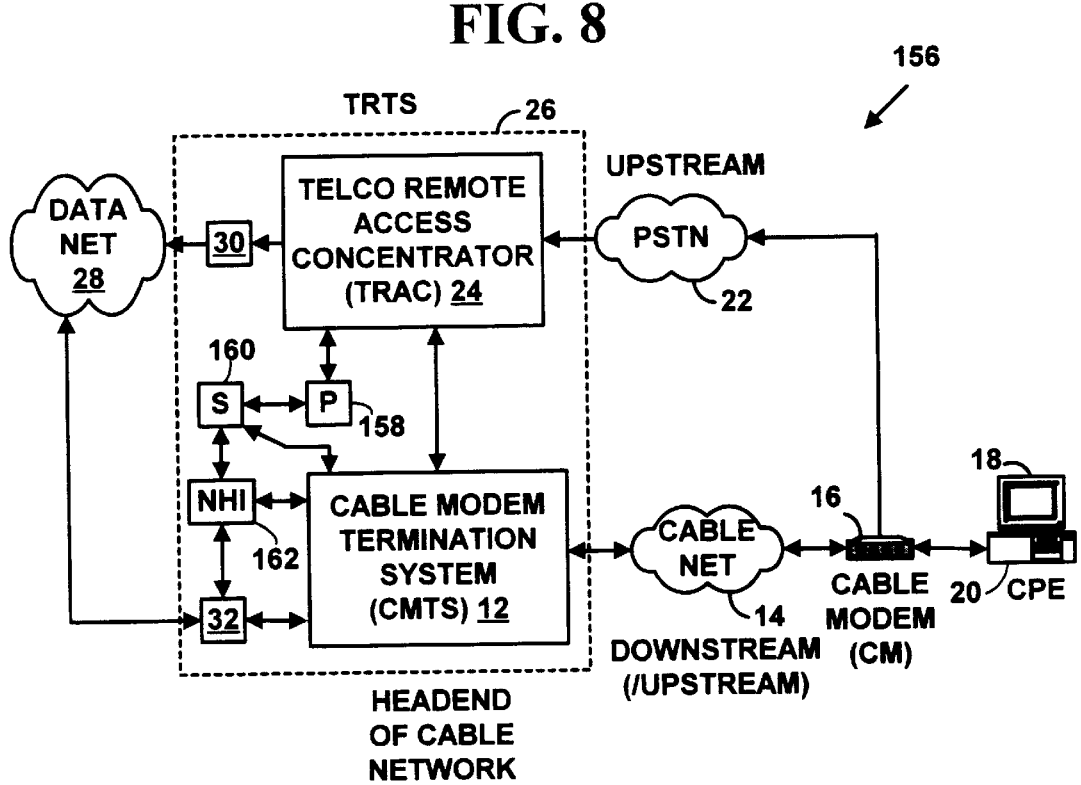
FIG. 8 is a block diagram illustrating a data-over-cable system for the method illustrated in FIGS. 7A and 7B.

FIG. 8 is a block diagram illustrating a data-over-cable system 156 for the method illustrated in FIGS. 7A and 7B. Data-over-cable system 156 includes DHCP 66 proxies 158, DHCP 66 servers 160 and associated Network Host Interfaces 162 available on CMTS 12. Multiple DHCP 66 proxies 158, DHCP 66 servers 160 and network host interfaces 162 are illustrated as single boxes in FIG. 8. FIG. 8 also illustrates DHCP 66 proxies 158 separate from TRAC 24. In one embodiment of the present invention, TRAC 24 includes DHCP 66 proxy functionality and no separate DHCP 66 proxies 158 are used. In such an embodiment, TRAC 24 forwards DHCP 66 messages using DHCP 66 giaddr-field 130 to DHCP 66 servers 160 available on CMTS 12.

Figure 9:
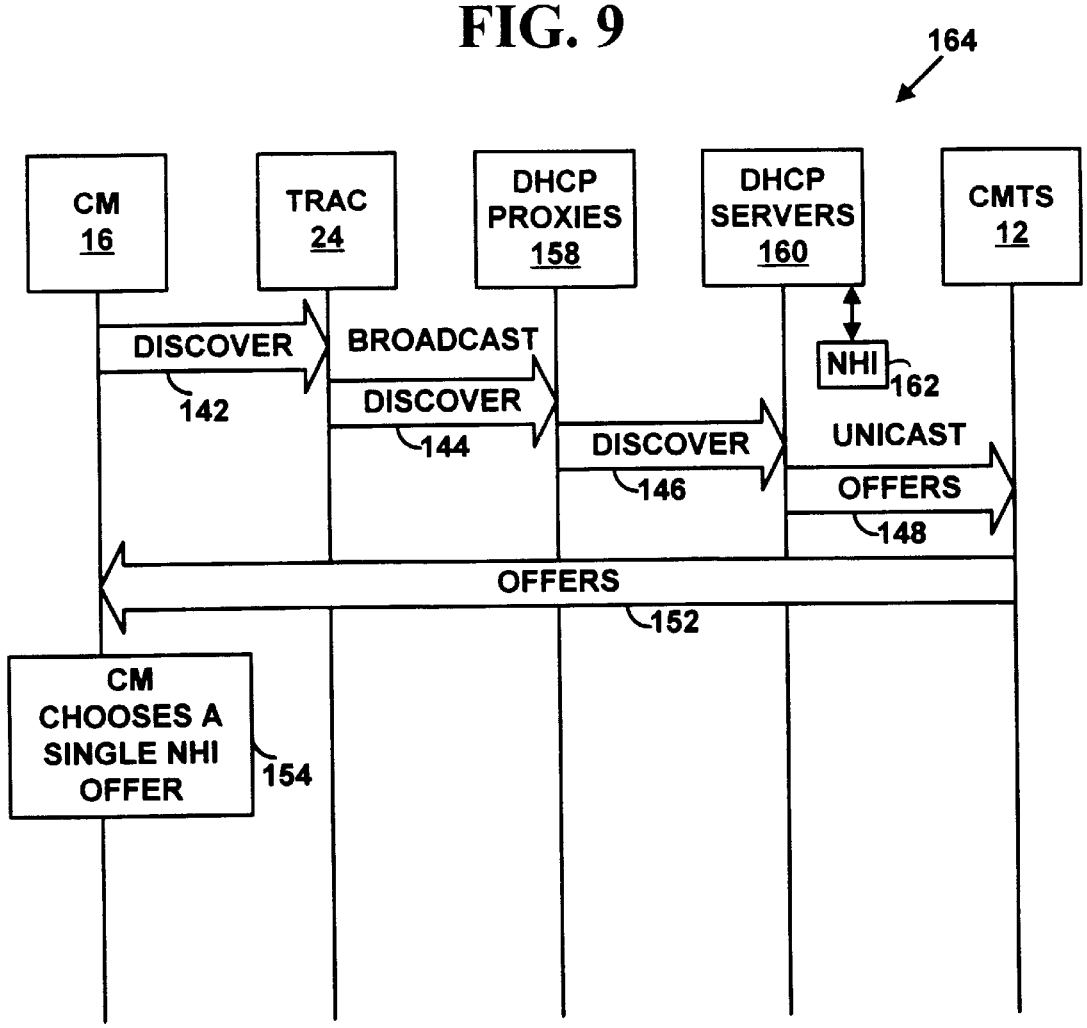
FIG. 9 is a block diagram illustrating the message flow of the method illustrated in FIGS. 7A and 7B.

FIG. 9 is a block diagram illustrating a message flow 162 of method 140 (FIGS. 7A and 7B).

Message flow 162 includes DHCP proxies 158 and DHCP servers 160 illustrated in FIG. 8 Steps 142, 144, 146, 148, 150 and 154 of method 140 (FIGS. 7A and 7B) are illustrated in FIG. 9. In one embodiment of the present invention, DHCP proxies 158 are not separate entities, but are included in TRAC 24. In such an embodiment, DHCP proxy services are provided directly by TRAC 24.

Resolving addresses for network host interfaces

Figure 10A:
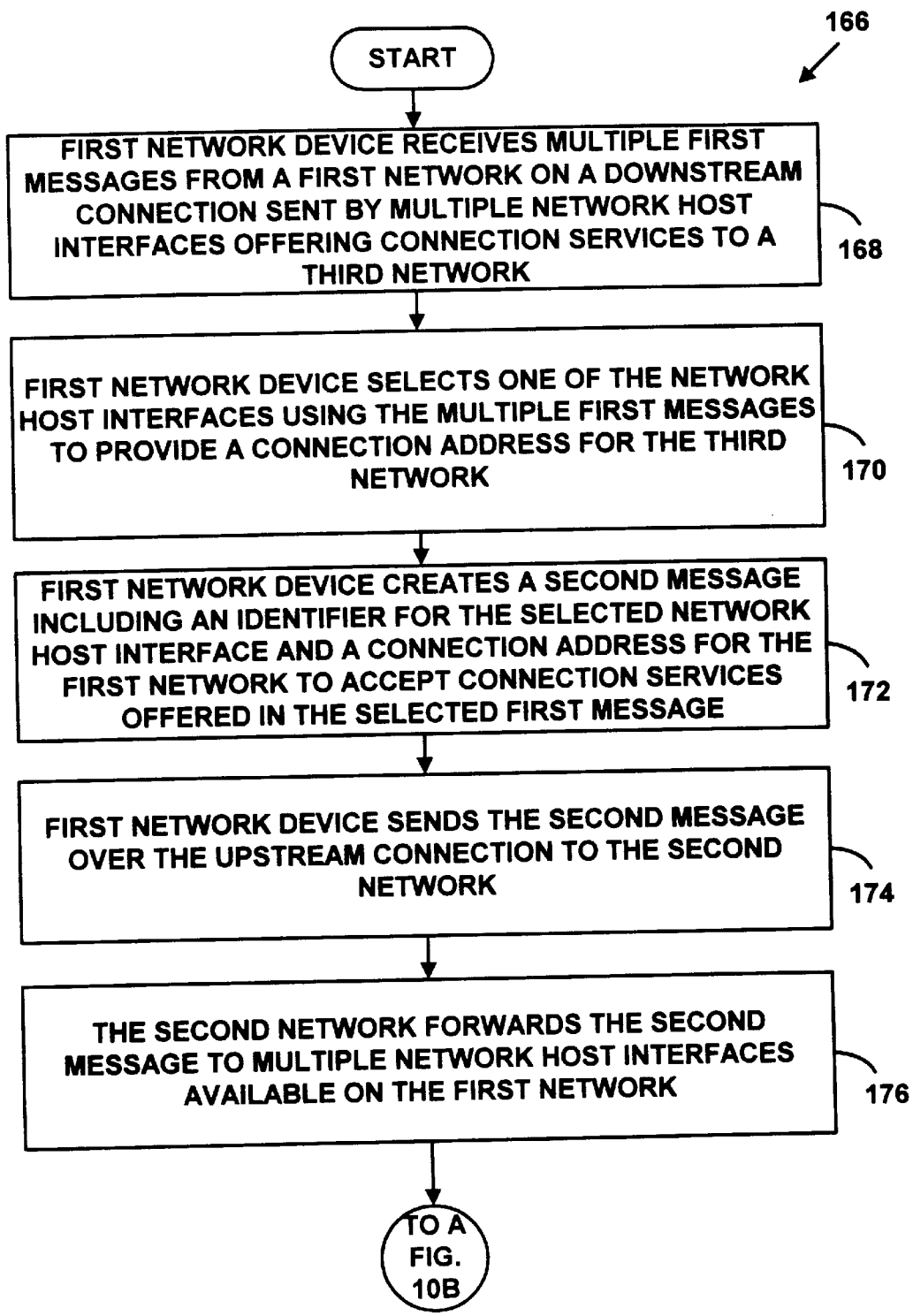
FIGS. 10A and 10B are a flow diagram illustrating a method for resolving host addresses in a data-over-cable system.
Figure 10B:
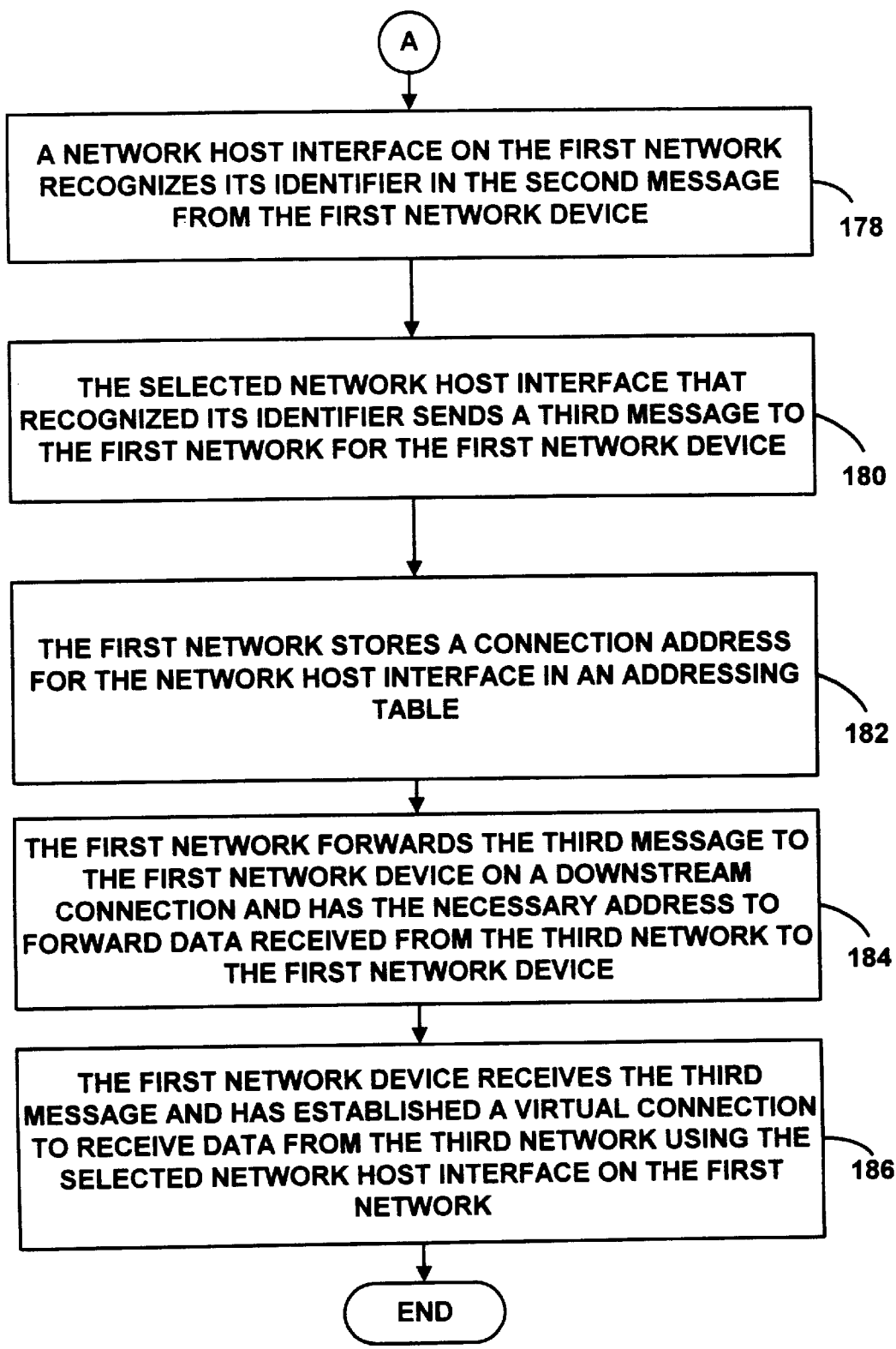

Since CM 16 receives multiple DHCPOFFER messages (Step 152 FIG. 7B) CM 16 resolves and acknowledges one offer from a selected network host interface. FIGS. 10A and 10B are a flow diagram illustrating a method 166 for resolving and acknowledging host addresses in a data-over-cable system. Method 166 includes a first network device that is connected to a first network with a downstream connection of a first connection type, and connected to a second network with an upstream connection of a second connection type. The first and second networks are connected to a third network with a third connection type. In one embodiment of the present invention, the first network device is CM 16, the first network is cable network 14, the second network is PSTN 22 and the third network is data network 28 (e.g., the Internet). The downstream connection is a cable television connection, the upstream connection is a telephony connection, and the third connection is an IP connection.

Turning to FIG. 10A, one or more first messages are received on the first network device from the first network on the downstream connection at step 168. The one or more first messages are offers from one or more network host interfaces available on the first network to provide the first network device a connection to the third network. The first network device selects one of the network host interfaces using message fields in one of the one or more first messages at step 170. The first network device creates a second message with a second message type to accept the offered services from a selected network host interface at step 172. The second message includes a connection address for the first network in a first message field and an identifier to identify the selected network host interface in a second message field.

The first network device sends the second message over the upstream connection to the second network at step 174. The second network uses the first message field in the second message to forward the second message to the one or more network host interfaces available on first network at step 176.

A network host interface available on the first network identified in second message field in the second message from the first network device recognizes an identifier for the network host interface at 178 in FIG. 10B. The selected network host interface sends a third message with a third message type to the first network at step 180. The third message is an acknowledgment for the first network device that the selected network host interface received the second message from the first network device. The first network stores a connection address for the selected network interface in one or more tables on the first network at step 182. The first network will forward data from the third network to the first network device when it is received on the selected network host interface using the connection address in the one or more routing tables. The first network forwards the third message to the first network device on the downstream connection at step 184. The first network device receives the third message at step 186. The first network and the first network device have the necessary addresses for a virtual connection that allows data to be sent from the third network to a network host interface on the first network, and from the first network over the downstream connection to the first network device. Method 166 accomplishes resolving network interface hosts addresses from a cable modem in a data-over-cable with telephony return.

Method 166 of the present invention is used in data-over-cable system 10 with telephony return. However, the present invention is not limited to data-over-cable system 10 with telephony return and can be used in data-over-cable system 10 without telephony return by using an upstream cable channel instead of an upstream telephony channel.

Figure 11B:
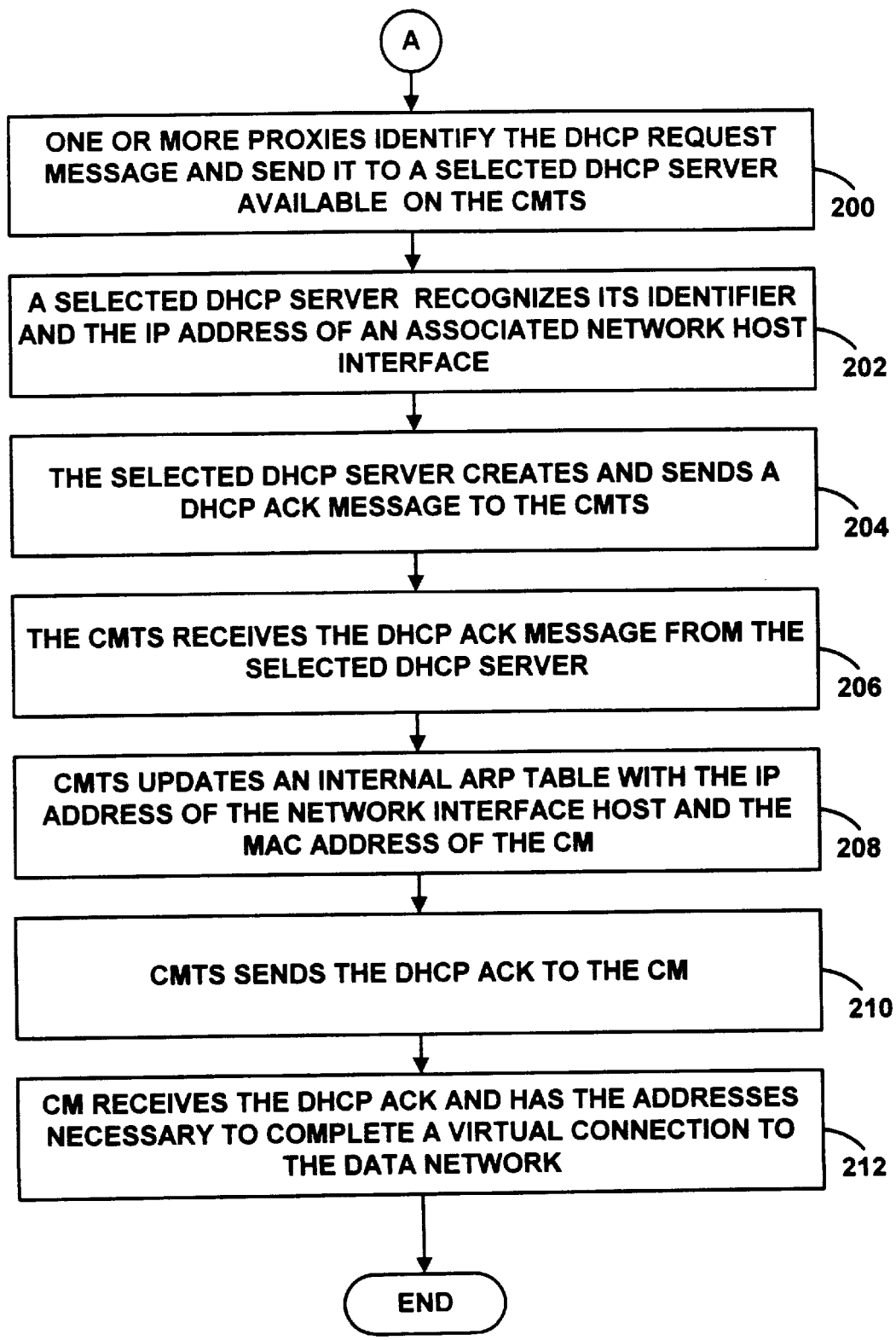
FIG. 11 is a flow diagram illustrating a method for resolving discovered host addresses.

FIGS. 11A and 11B are a flow diagram illustrating a method 188 for resolving discovered host addresses in data-over-cable system 10 with telephony return. At step 190 in FIG. 11A, CM 16 receives one or more DHCPOFFER messages from one or more DHCP 66 servers associated with one or more network host interfaces (e.g., at step 168 in method 166). The one or more DHCPOFFER messages include DHCP 66 fields set as illustrated in Table 7 above. However, other field settings could also be used. At step 192, CM 16 selects one of the DHCPOFFER messages (see also, step 170 in method 166). At step 194, CM 16 creates a DHCP 66 request message ("DHCPREQUEST") message to request the services offered by a network host interface selected at step 192. The fields of the DHCP request message are set as illustrated in Table 8. However, other field settings may also be used.

TABLE 8

| DHCP 66 Parameter | Description |
|---|---|
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 118 | Set BROADCAST bit to zero. |
| CIADDR 124 | If CM 16 has previously been assigned an IP address, the IP address is placed in this field. If CM 16 has previously been assigned an IP address by DHCP 66, and also has been assigned an address via IPCP, CM 16 places the DHCP 66 IP 54 address in this field. |
| YIADDR 126 | IP 54 address sent from the selected network interface host in DCHPOFFER message |
| GIADDR 130 | CM 16 places the Downstream Channel IP 54 address 80 CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network interface host |

The DHCPREQUEST message is used to "request" services from the selected IP 54 host interface available on CMTS 12 using a DHCP 66 server associated with the selected network host interface. DHCP 66 giaddr-field 130 (FIG. 6) includes the downstream channel IP address 80 for CMTS 12 obtained in TSI message 76 (e.g., the first message-field from step 172 of method 166). Putting the downstream channel IP address 80 obtained in TSI message 76 allows the DHCPREQUEST message to be forwarded by TRAC 24 to DCHP 66 servers associated with network host interfaces available on CMTS 12. DHCP 66 giaddr-field 126 contains an identifier (second message field, step 172 in method 166) DHCP 66 sname-field 134 contains a DHCP 66 server identifier associated with the selected network host interface.

If DHCP 66 giaddr-field 130 in a DHCP message from a DHCP 66 client is non-zero, a DHCP 66 server sends any return messages to a DHCP 66 server port on a DHCP 66 relaying agent (e.g., CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in DHCP 66 ciaddr-field 124, or to the client's hardware address specified in DHCP 66 chaddr-field 132 or to the local subnet broadcast address.

Returning to FIG. 11A at step 196, CM 16 sends the DHCPREQUEST message on the upstream connection to TRAC 24 via PSTN 22. At step 198, a DHCP 66 layer on TRAC 24 broadcasts the DHCPREQUEST message on its local network leaving DHCP 66 giaddr-field 130 intact since it already contains a non-zero value. TRACts 24 local network includes connections to one or more DHCP 66 proxies. The DHCP 66 proxies accept DHCP 66 messages originally from CM 16 destined for DHCP 66 servers associated with network host interfaces available on CMTS 12. In another embodiment of the present invention, TRAC 24 provides the DHCP 66 proxy functionality, and no separate DHCP 66 proxies are used.

The one or more DHCP 66 proxies on TRAC's 24 local network message forwards the DHCPOFFER to one or more of the DHCP 66 servers associated with network host interfaces (e.g., IP 54 interfaces) available on CMTS 12 at step 200 in FIG. 11B. Since DHCP 66 giaddr-field 130 in the DHCPDISCOVER message sent by CM 16 is already non-zero (i.e., contains the downstream IP address of CMTS 12), the DHCP 66 proxies leave DHCP 66 giaddr-field 130 intact.

One or more DHCP 66 servers for the selected network host interfaces (e.g., IP 54 interface) available on CMTS 12 receives the DHCPOFFER message at step 202. A selected DHCP 66 server recognizes a DHCP 66 server identifier in DHCP 66 sname-field 134 or the IP 54 address that was sent in the DCHPOFFER message in the DHCP 66 yiaddr-field 126 from the DHCPREQUST message as being for the selected DHCP 66 server.

The selected DHCP 66 server associated with network host interface selected by CM 16 in the DHCPREQUEST message creates and sends a DCHP 66 acknowledgment message ("DHCPACK") to CMTS 12 at step 204. The DHCPACK message is sent with the message fields set as illustrated in Table 9. However, other field settings can also be used. DHCP 66 yiaddr-field again contains the IP 54 address for the selected network host interface available on CMTS 12 for receiving data packets from data network 28.

TABLE 9

| DHCP 66 Parameter | Description |
|---|---|
| FLAGS 122 | Set a BROADCAST bit to zero. |
| YIADDR 126 | IP 54 address for the selected network host interface to allow CM 16 to receive data from data network 28. |

TABLE 9-continued

| DHCP 66 Parameter | Description |
|---|---|
| SIADDR 128 | An IP 54 address for a TFTP 64 server to download configuration information for an interface host. |
| CHADDR 132 | MAC 44 address of CM 16. |
| SNAME 134 | DHCP 66 server identifier associated with the selected network host interface. |
| FILE 136 | A configuration file name for an network interface host. |

The selected DHCP 66 server sends the DHCACK message to the address specified in DHCP 66 giaddr-field 130 from the DHCPREQUEST message to CM 16 to verify the selected network host interface (e.g., IP 54 interface) will offer the requested service (e.g., IP 54 service).

At step 206, CMTS 12 receives the DHCPACK message from the selected DHCP 66 server associated with the selected network host interface IP 54 address(e.g., IP 54 interface). CMTS 12 examines DHCP 66 yiaddr-field 126 and DHCP 66 chaddr-field 132 in the DHCPOFFER messages. DHCP 66 yiaddr-field 126 contains an IP 54 address for a network host IP 54 interface available on CMTS 12 and used for receiving IP 54 data packets from data network 28 for CM 16. DHCP 66 chaddr-field 132 contains the MAC 44 layer address for CM 16 on a downstream cable channel from CMTS 12 via cable network 14.

CMTS 12 updates an Address Resolution Protocol ("ARP") table and other routing tables on CMTS 12 to reflect the addresses in DHCP 66 yiaddr-field 126 and DHCP 66 chaddr-field 132 at step 208. As is known in the art, ARP allows a gateway such as CMTS 12 to forward any datagrams from a data network such as data network 28 it receives for hosts such as CM 16. ARP is defined in RFC-826, incorporated herein by reference.

CMTS 12 stores a pair of network address values in the ARP table, the IP 54 address of the selected network host interface from DHCP 66 yiaddr-field 126 and a Network Point of Attachment ("NPA") address. In an illustrative embodiment of the present invention, The NPA address is a MAC 44 layer address for CM 16 via a downstream cable channel. The IP/NPA address pair are stored in local routing tables with the IP/NPA addresses of hosts (e.g., CMs 16) that are attached to cable network 14.

At step 210, CMTS 12 sends the DHCPACK message to CM 16 via cable network 14. At step 212, CM 16 receives the DHCPACK message, and along with CMTS 12 has addresses for a virtual connection between data network 28 and CM 16. When data packets arrive on the IP 54 address for the selected host interface they are sent to CMTS 12 and CMTS 12 forwards them using a NPA (i.e., MAC 44 address) from the routing tables on a downstream channel via cable network 14 to CM 16.

If a BROADCAST bit in flags field 124 is set to one in the DHCPACK, CMTS 12 sends the DHCPACK messages to a broadcast IP 54 address (e.g., 255.255.255.255). DHCP 66 chaddr-field 132 is still used to determine that MAC layer address. If the BROADCAST bit in flags field 122 is set, CMTS 12 does not update the ARP table or offer routing tables based upon DHCP 66 yiaddr-field 126 and DHCP 66 chaddr-field 132 pair when a broadcast message is sent.

FIG. 12 is a block diagram illustrating the message flow 214 of the method 188 illustrated in FIGS. 11A and 11B. Message flow 214 includes DHCP proxies 158 and DHCP servers 160 illustrated in FIG. 8. Method steps 194, 196, 198, 204, 208, 210 and 212 of method 188 (FIGS. 11A and 11B) are illustrated in FIG. 12. In one embodiment of the present invention, DHCP proxies 158 are not separate entities, but are included in TRAC 24. In such an embodiment, DHCP proxy services are provided directly by TRAC 24.

After method 188, CMTS 12 has a valid IP/MAC address pair in one or more address routing tables including an ARP table to forward IP 54 data packets from data network 28 to CM 16, thereby creating a virtual IP 54 data path to/from CM 16 as was illustrated in method 92 (FIG. 5) and Table 3. CM 16 has necessary parameters to proceed to the next phase of initialization, a download of a configuration file via TFTP 64. Once CM 16 has received the configuration file and has been initialized, it registers with CMTS 12 and is ready to receive data from data network 14.

In the event that CM 16 is not compatible with the configuration of the network host interface received in the DHCPACK message, CM 16 may generate a DHCP 66 decline message ("DHCPDECLINE") and transmit it to TRAC 24 via PSTN 22. A DHCP 66 layer in TRAC 24 forwards the DHCPDECLINE message to CMTS 12. Upon seeing a DHCPDECLINE message, CMTS 12 flushes its ARP tables and routing tables to remove the now invalid IP/MAC pairing. If an IP 54 address for a network host interface is returned that is different from the IP 54 address sent by CM 16 in the DCHCPREQUEST message, CM 16 uses the IP 54 address it receives in the DHCPACK message as the IP 54 address of the selected network host interface for receiving data from data network 28.

The present invention is described with respect to, but is not limited to a data-over-cable-system with telephony return. Method 188 can also be used with a cable modem that has a two-way connection (i.e., upstream and downstream) to cable network 14 and CMTS 12. In a data-over-cable-system without telephony return, CM 16 would broadcast the DHCPREQUEST message to one or more DHCP 66 servers associated with one or more network host interfaces available on CMTS 12 using an upstream connection on data network 14 including the IP 54 address of CMTS 12 in DHCP 66 giaddr-field 130. Method 188 accomplishes resolving addresses for network interface hosts from a cable modem in a data-over-cable with or without telephony return, and without extensions to the existing DHCP protocol.

CPE initialization in a data-over-cable system

Figure 13A:
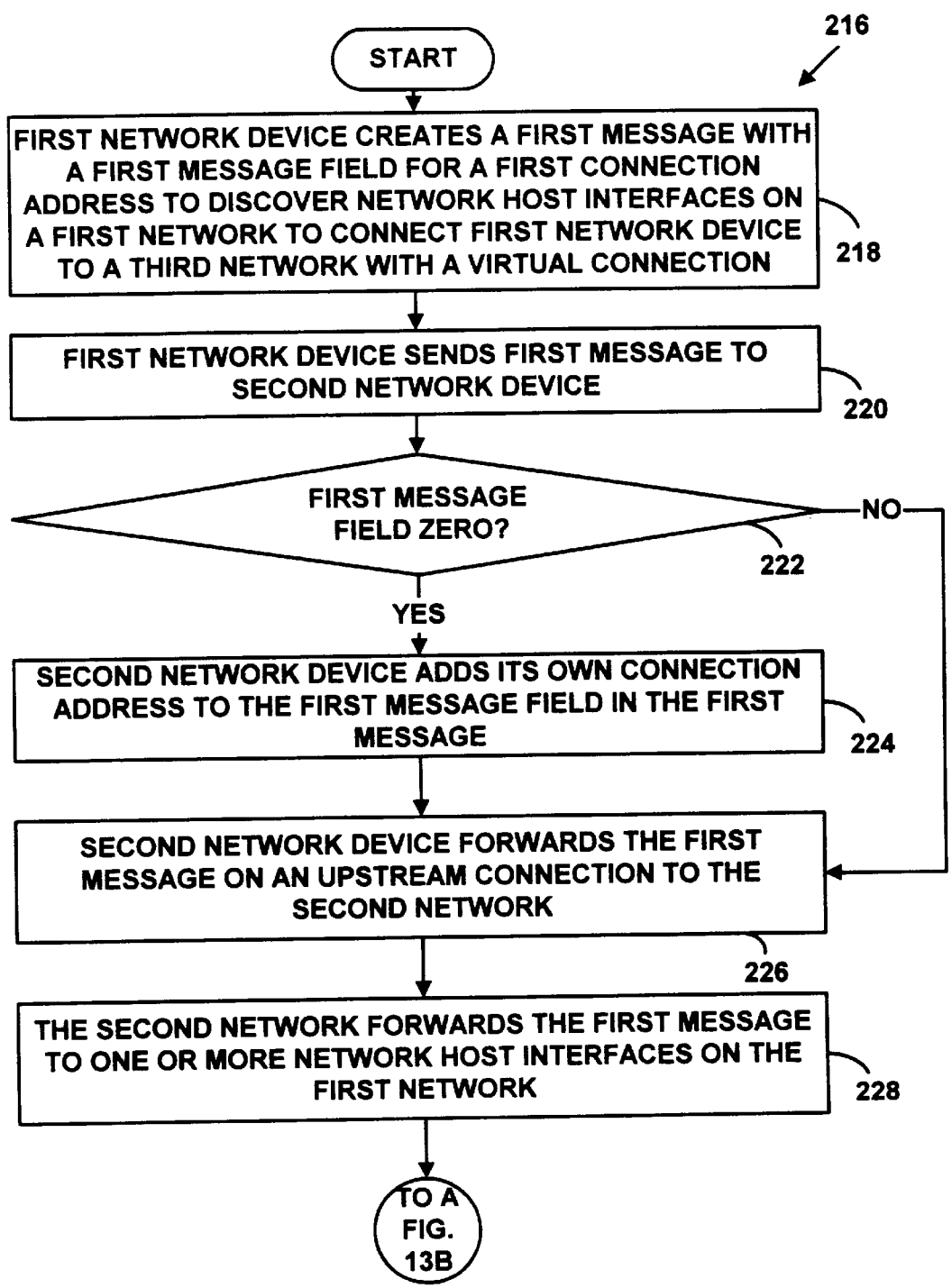
FIGS. 13A and 13B are a flow diagram illustrating a method for obtaining addresses for customer premise equipment.
Figure 13B:
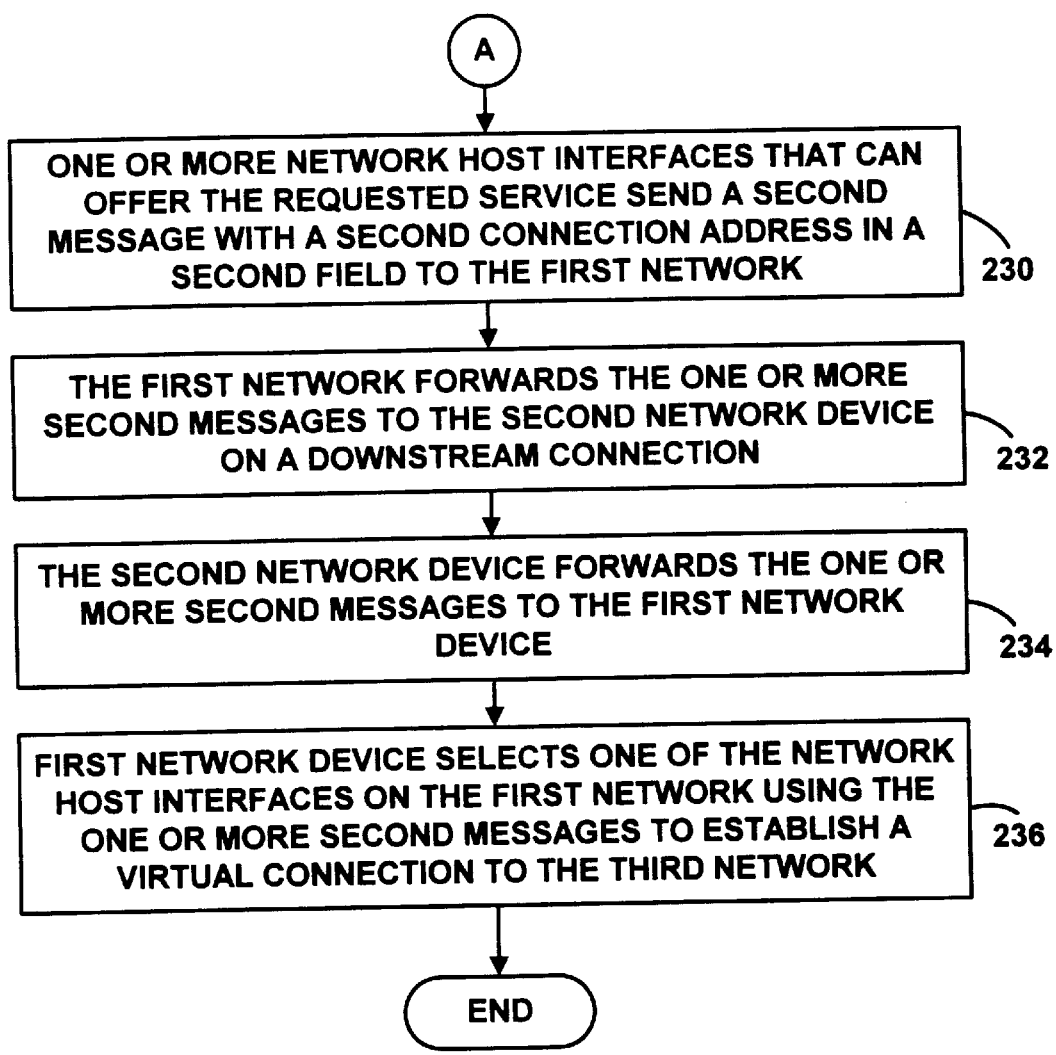

CPE 18 also uses DHCP 66 to generate requests to obtain IP 54 addresses to allow CPE 18 to also receive data from data network 28 via CM 16. In an illustrative embodiment of the present invention, CM 16 functions as a standard BOOTP relay agent/DHCP Proxy 158 to facilitate CPE's 18 access to DHCP 66 server 160. FIGS. 13A and 13B are a flow diagram illustrating a method 216 for obtaining addresses for customer premise equipment. CM 16 and CMTS 12 use information from method 214 to construct IP 54 routing and ARP table entries for network host interfaces 162 providing data to CMCI 20 and to CPE 18.

Method 216 in FIGS. 13A and 13B includes a data-over-cable system with telephony return and first network device with a second network device for connecting the first network device to a first network with a downstream connection of a first connection type, and for connecting to a second network with an upstream connection of a second connection type. The first and second networks are connected to a third network with a third connection type.

In one embodiment of the present invention, data-over-cable system with telephony return is data-over-cable system 10 with the first network device CPE 18 and the second network device CM 16. The first network is cable television network 14, the downstream connection is a cable television connection, the second network is PSTN 22, the upstream connection is a telephony connection, the third network is data network 28 (e.g., the Internet or an intranet) and the third type of connection is an IP 54 connection. However, the present invention is not limited to the network components described and other network components may also be used. Method 216 allows CPE 18 to determine an IP 54 network host interface address available on CMTS 12 to receive IP 54 data packets from data network 54, thereby establishing a virtual IP 54 connection with data network 28 via CM 16.

Returning to FIG. 13A at step 218, a first message of a first type (e.g., a DHCP 66 discover message) with a first message field for a first connection is created on the first network device. The first message is used to discover a network host interface address on the first network to allow a virtual connection to the third network.

At step 220, the first network device sends the first message to the second network device. The second network device checks the first message field at step 222. If the first message field is zero, the second network device puts its own connection address into the first message field at step 224. The second network device connection address allows the messages from network host interfaces on the first network to return messages to the second network device attached to the first network device. If the first message field is non-zero, the second network device does not alter the first message field since there could be a relay agent attached to the first network device that may set the first connection address field.

At step 226, the second network device forwards the first message to a connection address over the upstream connection to the second network. In one embodiment of the present invention, the connection address is an IP broadcast address (e.g., 255.255.255.255). However, other connection addresses can also be used.

The second network uses the first connection address in the first message field in the first message to forward the first message to one or more network host interfaces (e.g., IP 54 network host interfaces) available on first network at step 228. One or more network host interfaces available on the first network that can provide the services requested in first message send a second message with a second message type with a second connection address in a second message field to the first network at step 230 in FIG. 13B. The second connection address allows the first network device to receive data packets from the third network via a network host interface on the first network. The first network forwards the one or more second messages on the downstream connection to the second network device at step 232. The second network device forwards the one or more second messages to the first network device at step 234. The first network device selects one of the one or more network host interfaces on the first network using the one or more second messages at step 236. This allows a virtual connection to be established between the third network and the first network device via the selected network host interface on the first network and the second network device.

FIGS. 14A and 14B are a flow diagram illustrating a method 240 for resolving addresses for the network host interface selected by a first network device to create a virtual connection to the third network. Turning to FIG. 14A, at step 240 one or more second messages are received with a second message type on the first network device from the second network device from the first network on a downstream connection at step 242. The one or more second messages are offers from one or more protocol servers associated with one or more network host interfaces available on the first network to provide the first network device a connection to the third network. The first network device selects one of the network host interfaces using one of the one or more second messages at step 244. The first network device creates a third message with a third message type to accept the offered services from the selected network host interface at step 246. The third message includes a connection address for the first network in a first message field and an identifier to identify the selected network host interface in a second message field. At step 248, first network device equipment sends the third message to the second network device.

The second network device sends the third message over the upstream connection to the second network at step 250. The second network uses the first message field in the third message to forward the third message to the one or more network host interfaces available on first network at step 252.

A network host interface available on the first network identified in second message field in the third message from the first network device recognizes an identifier for the selected network host interface at step 254 in FIG. 14B. The selected network host interface sends a fourth message with a fourth message type to the first network at step 256. The fourth message is an acknowledgment for the first network device that the selected network host interface received the third message. The fourth message includes a second connection address in a third message field. The second connection address is a connection address for the selected network host interface. The first network stores the connection address for the selected network interface from the third message in one or more routing tables (e.g., an ARP table) on the first network at step 258. The first network will forward data from the third network to the first network device via the second network device when it is received on the selected network host interface using the connection address from the third message field. The first network forwards the fourth message to the second network device on the downstream connection at step 260. The second network device receives the fourth message and stores the connection address from the third message field for the selected network interface in one or more routing tables on the second network device at step 262. The connection address for the selected network interface allows the second network device to forward data from the third network sent by the selected network interface to the customer premise equipment.

At step 264, the second network device forward the fourth message to the first network device. At step 266, the first network device establishes a virtual connection between the third network and the first network device.

After step 266, the first network, the second network device and the first network device have the necessary connection addresses for a virtual connection that allows data to be sent from the third network to a network host interface on the first network, and from the first network over the downstream connection to the second network and then to the first network device. In one embodiment of the present invention, method 240 accomplishes resolving network interface hosts addresses from customer premise equipment with a cable modem in a data-over-cable with telephony return without extensions to the existing DHCP protocol.

Methods 216 and 240 of the present invention are used in data-over-cable system 10 with telephony return with CM 16 and CPE 18. However, the present invention is not limited to data-over-cable system 10 with telephony return and can be used in data-over-cable system 10 without telephony return by using an upstream cable channel instead of an upstream telephony channel.

FIGS. 15A and 15B are a flow diagram illustrating a method 268 for addressing network host interfaces from CPE 18. At step 270 in FIG. 15A, CPE 18 generates a DHCPDISCOVER message broadcasts the DHCPDISCOVER message on its local network with the fields set as illustrated in Table 6 above with addresses for CPE 18 instead of CM 16. However, more or fewer field could also be set. CM 16 receives the DHCPDISCOVER as a standard BOOTP relay agent at step 272. The DHCP DISCOVER message has a MAC 44 layer address for CPE 18 in DHCP 66 chaddr-field 132, which CM 16 stores in one or more routing tables. As a BOOTP relay agent, the CM 16 checks the DHCP 66 giaddr-field 130 (FIG. 6) at step 274. If DHCP 66 giaddr-field 130 is set to zero, CM 16 put its IP 54 address into DHCP 66 giaddr-field 130 at step 276.

If DHCP 66 giaddr-field 130 is non-zero, CM 16 does not alter DHCP 66 giaddr-field 130 since there could be another BOOTP relay agent attached to CPE 18 which may have already set DHCP 66 giaddr-field 130. Any BOOTP relay agent attached to CPE 18 would have also have acquired its IP 54 address from using a DCHP 66 discovery process (e.g., FIG. 12).

Returning to FIG. 15A, at step 278, CM 16 broadcasts the DHCPDISCOVER message to a broadcast address via PSTN 22 to TRAC 24. In one embodiment of the present invention, the broadcast address is an IP 54 broadcast address (e.g., 255.255.255.255). At step 280, one or more DHCP 66 proxies 158 associated with TRAC 24, recognize the DHCPDISOVER message, and forward it to one or more DHCP 66 servers 160 associated with one or more network host interfaces 162 available on CMTS 12. Since DHCP 66 giaddr-field 130 is already non-zero, the DHCP proxies leave DHCP 66 giaddr-field 130 intact. In another embodiment of the present invention, TRAC 24 includes DCHP 66 proxy 158 functionality and no separate DHCP 66 proxies 158 are used.

At step 282 in FIG. 15B, the one or more DHCP servers 160 receive the DHCPDISCOVER message from one or more DHCP proxies, and generate one or more DHCPOFFER messages to offer connection services for one or more network host interfaces 162 available on CMTS 12 with the fields set as illustrated in Table 7. The one or more DHCP servers 160 send the one or more DHCPOFFER messages to the address specified in DHCP 66 giaddr-field 130 (e.g., CM 16 or a BOOTP relay agent on CPE 18), which is an IP 54 address already contained in an ARP or other routing table in CMTS 12. Since CMTS 12 also functions as a relay agent for the one or more DHCP servers 160, the one or more DHCPOFFER messages are received on CMTS 12 at step 284.

CMTS 12 examines DHCP 66 yiaddr-field 126 and DHCP 66 giaddr-field 130 in the DHCPOFFER messages, and sends the DHCPOFFER messages down cable network 14 to IP 54 address specified in the giaddr-field 130. The MAC 44 address for CM 16 is obtained through a look-up of the hardware address associated with DHCP 66 chaddr-field 130. If the BROADCAST bit in DHCP 66 flags-field 122 is set to one, CMTS 12 sends the DHCPOFFER message to a broadcast IP 54 address (e.g., 255.255.255.255), instead of the address specified in DHCP 66 yiaddr-field 126. CMTS 12 does not update its ARP or other routing tables based upon the broadcast DCHP 66 yiaddr-field 126 DHCP 66 chaddr-field 132 address pair.

Returning to FIG. 15B, CM 16 receives the one or more DHCPOFFER messages and forwards them to CPE 18 at step 286. CM 16 uses the MAC 44 address specified determined by DHCP 66 chaddr-field 132 look-up in its routing tables to find the address of CPE 18 even if the BROADCAST bit in DHCP 66 flags-field 122 is set. At step 290, CPE 18 receives the one or more DHCPOFFER messages from CM 16. At step 292, CPE 18 selects one of the DHCPOFFER messages to allow a virtual connection to be established between data network 28 and CPE 18. Method 266 accomplishes addressing network interface hosts from CPE 18 in data-over-cable system 10 without extensions to the existing DHCP protocol.

Figure 16B:
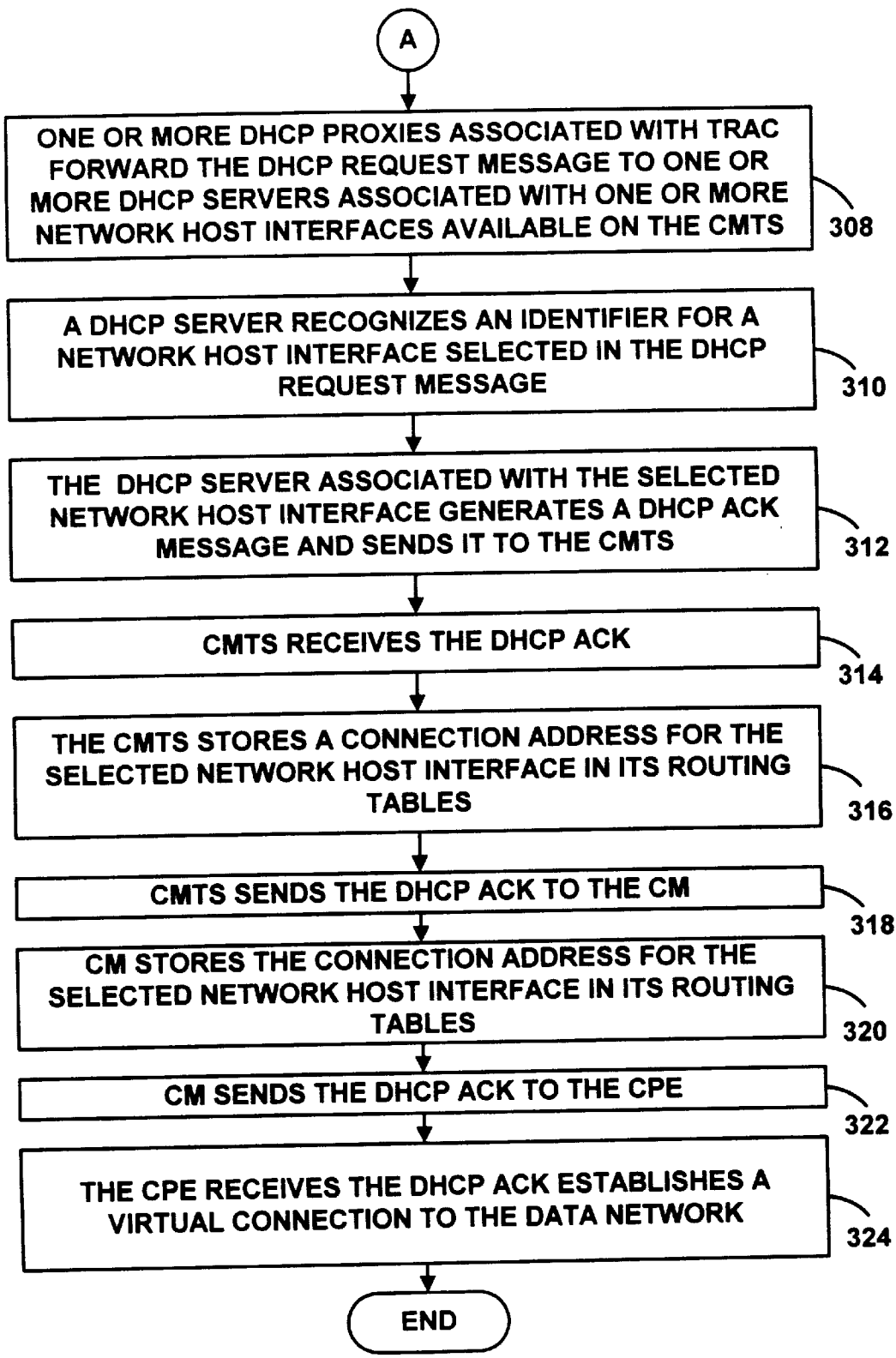

FIGS. 16A and 16B are a flow diagram illustrating a method 294 for resolving network host interfaces from CPE 18. At step 296, CPE 18 receives the one or more DHCPOFFER messages from one or more DHCP 66 servers associated with one or more network host interface available on CMTS 12. At step 298, CPE 18 chooses one offer of services from a selected network host interface. At step 300, CPE 18 generates a DHCPREQUEST message with the fields set as illustrated in Table 8 above with addresses for CPE 18 instead of CM 16. However, more or fewer fields could also be set. At step 302, CPE 18 sends the DHCPREQUEST message to CM 16. At step 304, CM 16 forwards the message to TRAC 24 via PSTN 22.

At step 306, a DHCP 66 layer on TRAC 24 broadcasts the DHCPREQUEST message on its local network leaving DHCP 66 giaddr-field 130 intact since it already contains a non-zero value. TRAC's 24 local network includes connections to one or more DHCP 66 proxies. The DHCP 66 proxies accept DHCP 66 messages originally from CPE 18 destined for DHCP 66 servers associated with network host interfaces available on CMTS 12. In another embodiment of the present invention, TRAC 24 provides the DHCP 66 proxy functionality, and no separate DHCP 66 proxies are used.

One or more DHCP 66 proxies on TRAC's 24 local network recognize the DHCPOFFER message and forward it to one or more of the DHCP 66 servers associated with network host interfaces (e.g., IP 54 interfaces) available on CMTS 12 at step 308 in FIG. 16B. Since DHCP 66 giaddr-field 130 in the DHCPDISCOVER message sent by CPE 18 is already non-zero, the DHCP 66 proxies leave DHCP 66 giaddr-field 130 intact.

One or more DHCP 66 servers for the selected network host interfaces (e.g., IP 54 interface) available on CMTS 12 receive the DHCPOFFER message at step 310. A selected DHCP 66 server recognizes a DHCP 66 server identifier in DHCP 66 sname-field 134 or the IP 54 address that was sent in the DCHPOFFER message in the DHCP 66 yiaddr-field 126 from the DHCPREQUST message for the selected DHCP 66 server.

The selected DHCP 66 server associated with network host interface selected by CPE 18 in the DHCPREQUEST message creates and sends a DCHP acknowledgment message ("DHCPACK") to CMTS 12 at step 312 using the DHCP 66 giaddr-field 130. The DHCPACK message is sent with the message fields set as illustrated in Table 9. However, other field settings can also be used. DHCP 66 yiaddr-field contains the IP 54 address for the selected network host interface available on CMTS 12 for receiving data packets from data network 28 for CPE 18.

At step 314, CMTS 12 receives the DHCPACK message. CMTS 12 examines the DHCP 66 giaddr-field 130 and looks up that IP address in its ARP table for an associated MAC 44 address. This is a MAC 44 address for CM 16, which sent the DHCPREQUEST message from CPE 18. CMTS 12 uses the MAC 44 address associated with the DHCP 66 giaddr-field 130 and the DHCP 66 yiaddr-field 126 to update its routing and ARP tables reflecting this address pairing at step 316. At step 318, CMTS 12 sends the DHCPACK message on a downstream channel on cable network 14 to the IP 54 and MAC 44 addresses, respectively (i.e., to CM 16). If the BROADCAST bit in the DHCP 66 flags-field 122 is set to one, CMTS 12 sends the DHCPACK message to a broadcast IP 54 address (e.g., 255.255.255.255), instead of the address specified in the DHCP 66 yiaddr-field 126. CMTS 12 uses the MAC 44 address associated with the DHCP 66 chaddr-field 130 even if the BROADCAST bit is set.

CM 16 receives the DHCPACK message. It examines the DHCP 66 yiaddr-field 126 and chaddr-field 132, and updates its routing table and an ARP routing table to reflect the address pairing at step 320. At step 322, CM 16 sends the DHCPACK message to CPE 18 via CMCI 20 at IP 54 and MAC 44 addresses respectively from its routing tables. If the BROADCAST bit in the DHCP 66 flags-field 122 is set to one, CM 16 sends the downstream packet to a broadcast IP 54 address (e.g., 255.255.255.255), instead of the address specified in DHCP 66 yiaddr-field 126. CM 16 uses the MAC 44 address specified in DHCP 66 chaddr-field 132 even if the BROADCAST bit is set to located CPE 18. At step 324, CPE 18 receives the DHCPACK from CM 16 and has established a virtual connection to data network 28.

In the event that CPE 18 is not compatible with the configuration received in the DHCPACK message, CPE 18 may generate a DHCP 66 decline ("DHCPDECLINE") message and send it to CM 16. CM 16 will transmit the DHCPDECLINE message up the PPP 50 link via PSTN 22 to TRAC 24. On seeing a DHCPDECLINE message TRAC 24 sends a unicast copy of the message to CMTS 12. CM 16 and CMTS 12 examine the DHCP 66 yiaddr-field 126 and giaddr-field 130, and update their routing and ARP tables to flush any invalid pairings.

Upon completion of methods 266 and 292, CM 16 CMTS 12 have valid IP/MAC address pairings in their routing and ARP tables. These tables store the same set of IP 54 addresses, but does not associate them with the same MAC 44 addresses. This is because CMTS 12 resolves all CPE 18 IP 54 addresses to the MAC 44 address of a corresponding CM 16. The CMs 16, on other hand, are able to address the respective MAC 44 addresses of their CPEs 18. This also allows DHCP 66 clients associated with CPE 18 to function normally since the addressing that is done in CM 16 and CMTS 12 is transparent to CPE 18 hosts.

FIG. 17 is a block diagram illustrating a message flow 326 for methods 268 and 294 in FIGS. 15A, 15B, and 16A and 16B. Message flow 326 illustrates a message flow for methods 268 and 294, for a data-over-cable system with and without telephony return. In another embodiment of the present invention, CM 16 forwards requests from CPE 18 via an upstream connection on cable network 14 to DHCP servers 160 associated with one or more network host interfaces available on CMTS 12.

Method 268 and 294 accomplishes resolving addresses for network interface hosts from customer premise equipment in a data-over-cable with or without telephony return without extensions to the existing DHCP protocol. Methods 268 and 294 of the present invention are used in data-over-cable system 10 with telephony return. However, the present invention is not limited to data-over-cable system 10 with telephony return and can be used in data-over-cable system 10 without telephony return by using an upstream cable channel instead of an upstream telephony channel.

Secure cable modem initialization

Figure 18:
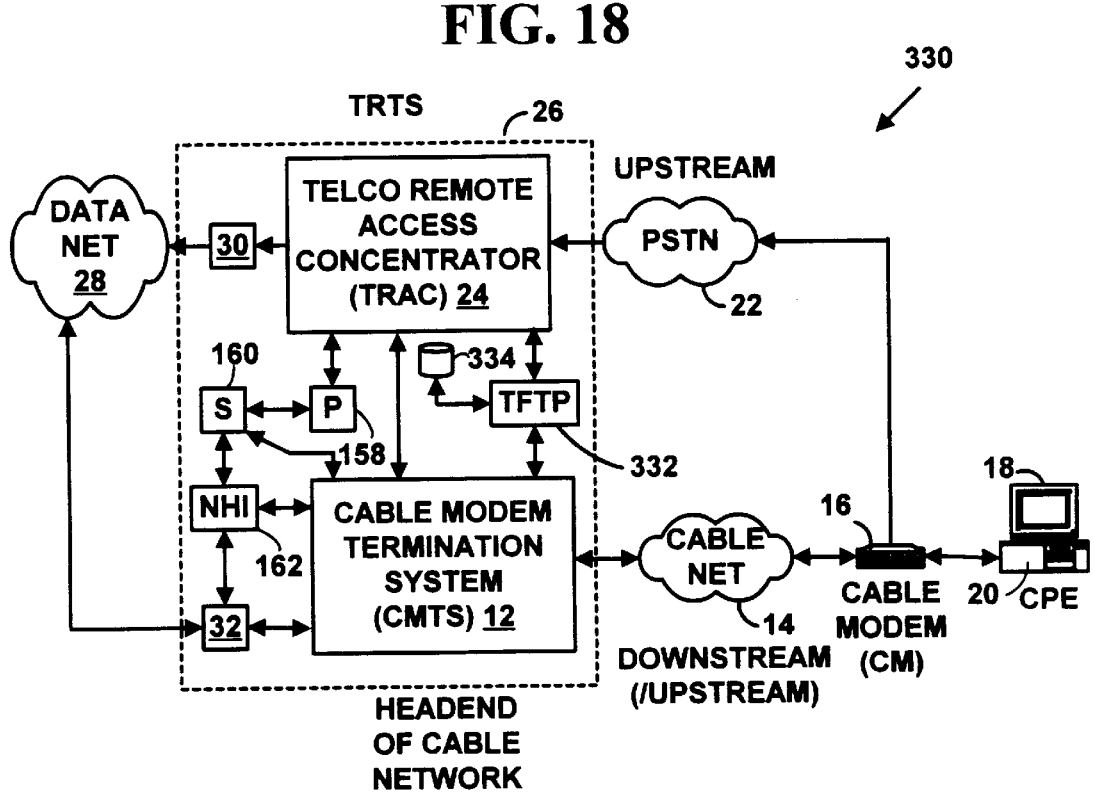
FIG. 18 is a block diagram illustrating a data-over-cable system for secure initialization of a cable modem.

FIG. 18 is a block diagram illustrating a data-over-cable system 330 used for an illustrative embodiment of the present invention. Data-over-cable system 330 is similar to the data-over-cable system illustrated in FIG. 8. However, FIG. 18 illustrates TFTP 64 server 332 used to obtain configuration information 334 for CM 16. Exemplary configuration information is illustrated in Type/Length/Value ("TLV") format in Table 10. However, more or fewer configuration parameters could also be used. In addition, only a description of the Value in the TLV format is included since the actual numbers used for the Value fields are implementation specific.

TABLE 10

| Type | Length | Description of Value |
| --- | --- | --- |
| 1 | 4 | Receive frequency |
| 2 | 1 | Upstream channel identifier |
| 4x | N | Class of service header |
| 41 | 1 | Class identifier |
| 42 | 4 | Maximum downstream data rate in bits/sec |
| 43 | 4 | Maximum upstream data rate in bits/sec |
| 44 | 1 | Upstream channel priority |
| 45 | 4 | Upstream guaranteed minimum data rate in bits/sec |
| 46 | 2 | Maximum upstream configuration setting in minislots |
| 47 | 1 | Privacy enable |
| 8 | 3 | Vendor Identifier configuration setting |
| 17x | N | Baseline privacy settings header |
| 171 | 4 | Authorize timeout seconds |
| 172 | 4 | Reauthorize wait timeout seconds |
| 173 | 4 | Authorization wait timeout seconds |
| 174 | 4 | Operational wait timeout seconds |
| 175 | 4 | Re-key wait timeout seconds |
| 176 | 4 | TEK grace time seconds |
| 9 | N | Software upgrade filename |
| 10 | 1 | SNMP access control |
| 11 | N | Arbitrary SNMP object setting |
| 0 | N | Padding for 4-byte boundary |
| 3 | 1 | Network access |
| 6 | 16 | CM-MIC |
| 7 | 16 | CMTS-MIC |
| 255 | N/A | End-of-file |

Figure 19:
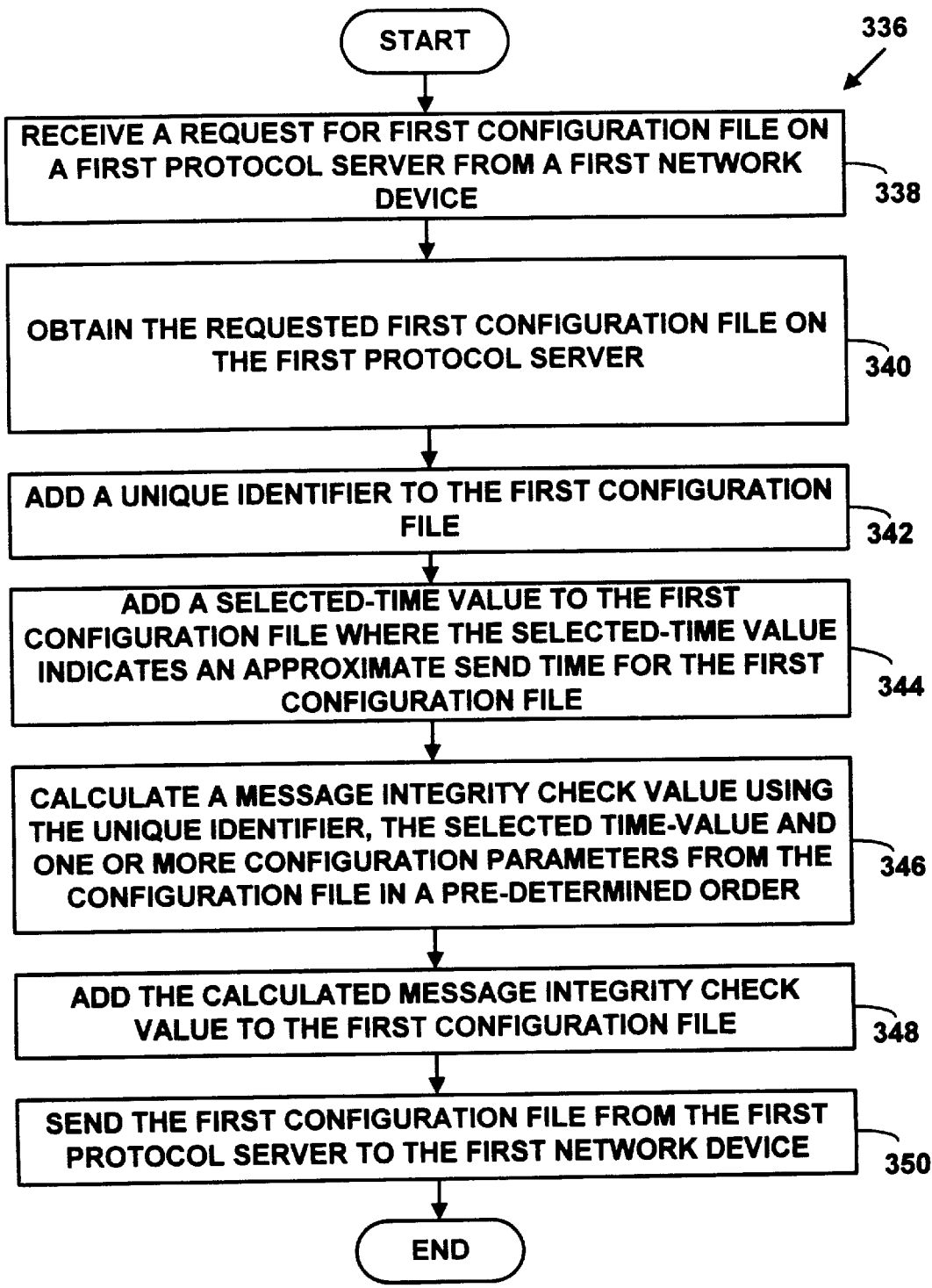
FIG. 19 is a flow diagram illustrating a method for secure initialization for a network device.

FIG. 19 is a flow diagram illustrating a method 336 for secure initialization for a network device in a data-over-cable system. Method 336 includes receiving a request for a first configuration file on a first protocol server from a first network device at step 338. The first configuration file includes multiple configuration parameters for initializing the first network device (e.g., from Table 10). In one embodiment, the requested configuration file is optionally obtained by the first protocol server from another location at step 340. In another embodiment of the present invention, the requested configuration file is obtained from the first protocol server. A unique identifier (e.g., a network address) for the network device is added to the first configuration file at step 342. In one embodiment of the present invention, the unique identifier is obtained by the first protocol server from a header in the first message. A selected time-value (e.g., a "time-now" value) is added to the first configuration file at step 344. The selected time-value indicates an approximate sending time of the first configuration file. A message integrity check value is calculated at step 346 using the unique identifier, selected time-value and one or more configuration parameters from the configuration file in a pre-determined order to uniquely identify the configuration parameters for the first network device. The message integrity check value is calculated using a pre-determined cryptographic technique function. The message integrity check value is added to the first configuration file at step 348. The first configuration file is sent from the first protocol server to the first network device at step 350.

The first network device uses the message integrity check value, the unique identifier and selected time-value to uniquely verify the integrity of the configuration information and prevent another network device from using the first configuration file at a later time. In an illustrative embodiment of the present invention, the first network device is CM 16, the unique identifier is an IP 54 address for CM 16, and the first protocol server is TFTP server 332. However, the present invention is not limited to the illustrative embodiment and other network devices, protocol servers, unique identifiers and messages in data-over-cable system 330 could also be used for secure initialization of a network device.

Figure 20:
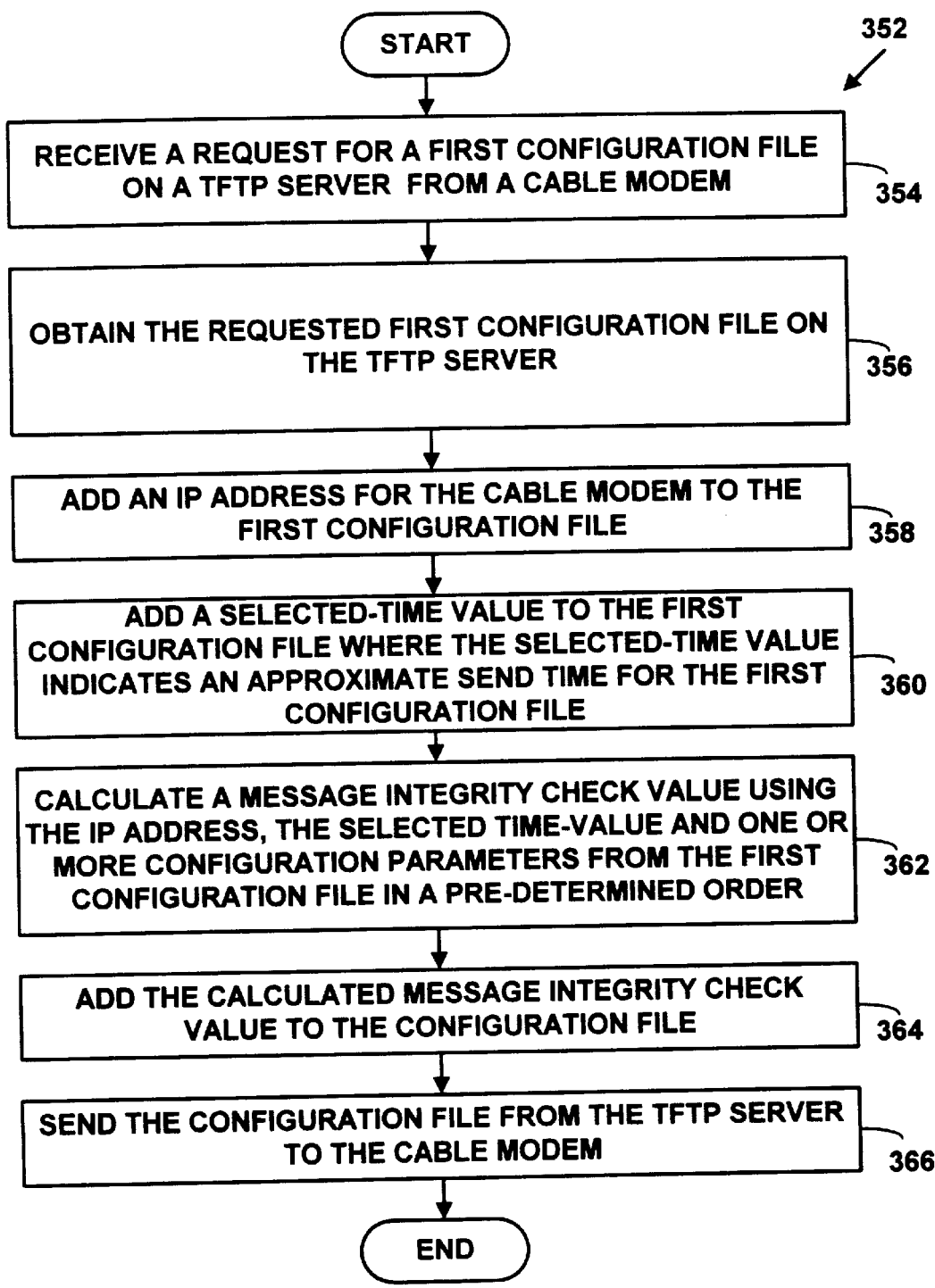
FIG. 20 is a flow diagram illustrating a method for secure initialization for a cable modem.

FIG. 20 is a flow diagram illustrating a method 352 for secure initialization for a cable modem. Method 352 includes receiving a TFTP 64 Read ReQuest message ("RRQ") for a first configuration file on TFTP server 332 from CM 16 at step 354. The first configuration file includes multiple configuration parameters (e.g., from Table 10) used to initialize CM 16. TFTP server 332 obtains the requested first configuration file at step 356. In one embodiment of the present invention, the first configuration file is obtained from DHCP server 160. In another embodiment of the present invention, the first configuration file is obtained from CMTS 12. In yet another embodiment of the present invention, the first configuration file is obtained from TFTP server 332. A unique identifier (e.g., a network address) for CM 16 is added to the first configuration file at step 358. In an illustrative embodiment of the present invention, the unique identifier is an IP 54 address that CM 16 received during the DHCP 66 initialization sequence (FIG. 12). However, other addresses or identifiers could also be used (e.g., MAC 44 address). In one embodiment of the present invention, the IP 54 address is obtained by TFTP server 332 from a header in the TFTP 64 RRQ message sent from CM 16. In another embodiment of the present invention IP 54 address is obtained from a DHCP 66 message or another protocol message. In another embodiment of the present invention, the unique identifier is a domain name for CM 16 (e.g., cm1.data-over-cable.net). A TFTP 64 message header typically includes a local medium header, an IP 54 header, a UDP header 60 and a TFTP 64 header. For more information on the TFTP 64 header, see RFC-1350. However, other unique identifiers from other locations could also be used (e.g., a MAC 44 address for CM 16).

Table 11 illustrates a unique identifier in TLV format added to the configuration file. However, other unique identifier formats could also be used.

TABLE 11

| Type | Length | Description of Value |
|------|--------|---------------------|
| Y | 4 | Unique identifier, e.g., IP 54 address of CM 16 |

A selected time-value is added to the configuration file at step 360. The selected time-value is called a "time-now" value and indicates an approximate sending time of the configuration file from TFTP server 332 to CM 16. Table 12 illustrates a selected time value in TLV format. However, other selected time-value formats could also be used.

TABLE 12

| Type | Length | Description of Value |
|------|--------|---------------------|
| Z | 4 | Number of seconds since 00:00 on January 1, 1970. (UNIX Epoch Time, RFC-868) |

The selected time value is used as defined in RFC-868; incorporated herein by reference. However, the selected time-value is the number of seconds since time 00:00, or midnight on Jan. 1, 1970 (i.e., UNIX epoch time) instead of since time 00:00, or midnight on Jan. 1, 1900. However, other time values and formats could also be used (e.g., seconds since boot time, or a common network clock time).

An additional field is used in the configuration file to indicate the addition of configuration parameters such as the unique identifier and selected time-value to the configuration file. Table 13 illustrates a configuration file type TLV used for additional configuration parameters. However, other configuration file types could also be used.

TABLE 13

| Type | Length | Description of Value |
|------|--------|---------------------|
| T | 1 | Configuration File Version |

Table 14 illustrates values for the configuration file version values. However, more or fewer configuration file versions could also be used.

TABLE 14

| Configuration File Version Value | Definition of value |
|----------------------------------|--------------------|
| 0 | Default, no additional configuration parameters added. |
| 1 | Additional configuration parameters added (e.g., unique identifier and selected time-value) |

Returning to FIG. 20, a Message Integrity Check ("MIC") value is calculated using the unique identifier (Table 11), the selected time-value (Table 12) and one or more configuration parameters from the configuration information (Tables 10) in a pre-determined order to uniquely identify the configuration file for CM 16 at step 362. A cryptographic hashing function is used to calculate the MIC Value.

In one embodiment of the present invention, authentication of the configuration information in the registration request message is provided by two Message Integrity Check ("MIC") fields, "CM-MIC" and "CMTS-MIC" (Type 6 and Type 7, Table 10). The CM-MIC is a cryptographic digest created with cryptographic hashing function (e.g., Message Digest 5 ("MD5")) that ensures data sent from CM 16 is not modified en-route. CM-MIC is not an authenticated digest (i.e., it does not include any shared secret password). The CMTS-MIC is also a cryptographic digest used authenticate configuration information.

In one embodiment of the present invention, MD5 cryptographic hashing function is used to create the CM-MIC and CMTS-MIC digests as described in RFC-2104; incorporated herein by reference. However, other cryptographic hashing functions could also be used. As is known in the cryptography arts, MD5 is a secure, one-way hashing function used to create a secure hash value that is used to authenticate messages.

A CM-MIC value in a cable modem configuration file is calculated by performing an MD5 digest over the bytes of the TLV entries for the configuration parameters. However, in an illustrative embodiment of the present invention, a CM-MIC value includes the unique identifier (Table 11) and selected time-value (Table 12) that are added to the configuration file at steps 342 and 344 respectively of method 338, as well as one or more of the configuration parameters illustrated in Table 10.

A CMTS-MIC value is calculated for a cable modem configuration file using the method shown in Table 15.

TABLE 15

CMTS-MIC field for a cable modem configuration file is calculated by performing an MD5 digest over the following configuration parameter fields, when present in the configuration file, in the order shown:
• Downstream Frequency Configuration parameter
• Upstream Channel ID Configuration parameter
• Network Access Configuration parameter
• Class of Service Configuration parameter
• Vendor ID Configuration parameter
• Baseline Privacy Configuration parameters
• Vendor specific Configuration parameters
• CM-MIC Value
• Authentication string.
The configuration parameter fields are treated as if they were contiguous data when calculating the MD 5 digest.

The one or more configuration parameters include a unique identifier (Table 11) and a selected-time value (Table 12) and one or more other configuration parameters (Table 15). At step 372, the first message integrity value is added to a configuration file. At step 374, a second message integrity value (e.g., CMTS-MIC) is calculated on one or more configuration parameters and the first message integrity value in a pre-determined order. The second message integrity value is calculated using the unique identifier (Table 11), the selected-time value (Table 12), the first message integrity value (e.g., CM-MIC), and one or more other additional configuration parameters (Table 15). In another embodiment of the present invention, the first and second message integrity values are calculated using the unique identifier or the selected time-value and one or more configuration parameters in a pre-determined order. In yet another embodiment of the present invention, calculating the second message integrity includes the unique identifier or the selected time-value and one or more additional configuration parameters in a pre-determined order but does not include the first message integrity value. In yet another embodiment of the present invention, the first message integrity value is not calculated, and only a second message integrity value is calculated using the unique identifier and the selected time-value.

In an illustrative embodiment of the present invention, the first message integrity value of method 368 is a CM-MIC, the second message integrity value is a CMTS-MIC and the configuration file is created by TFTP server 332 and sent to CM 16. However, other message integrity values and message integrity calculations could also be used.

Table 16 illustrates step 374 of method 368 for an illustrative embodiment of the present invention for calculating the second message integrity value in a pre-determined order. However, more or fewer configuration parameters and other orderings could also be used.

TABLE 16

1. Use one or more of the configuration parameters from the configuration file as shown in Table 15 when present in the order listed.
2. Use the unique identifier, selected time-value and one or more of the configuration parameters from Table 15 and calculate a MIC value by performing an MD5 digest over the configuration parameters, when present in the configuration file, in the order shown:
   • One or more configuration parameters (Table 10, Table 15)
   • Selected time-value (Table 12)
   • Network address (Table 11).
3. Add the MIC value to the configuration file.

However, in an illustrative embodiment of the present invention, the CMTS-MIC value is calculated using the unique identifier (Table 11), the selected time-value (Table 12) and one or more configuration parameters (Table 15) in a pre-determined order. In another embodiment of the present invention a single MIC value is calculated using only the unique identifier (Table 11) and the selected time-value (Table 12).

Figure 21:
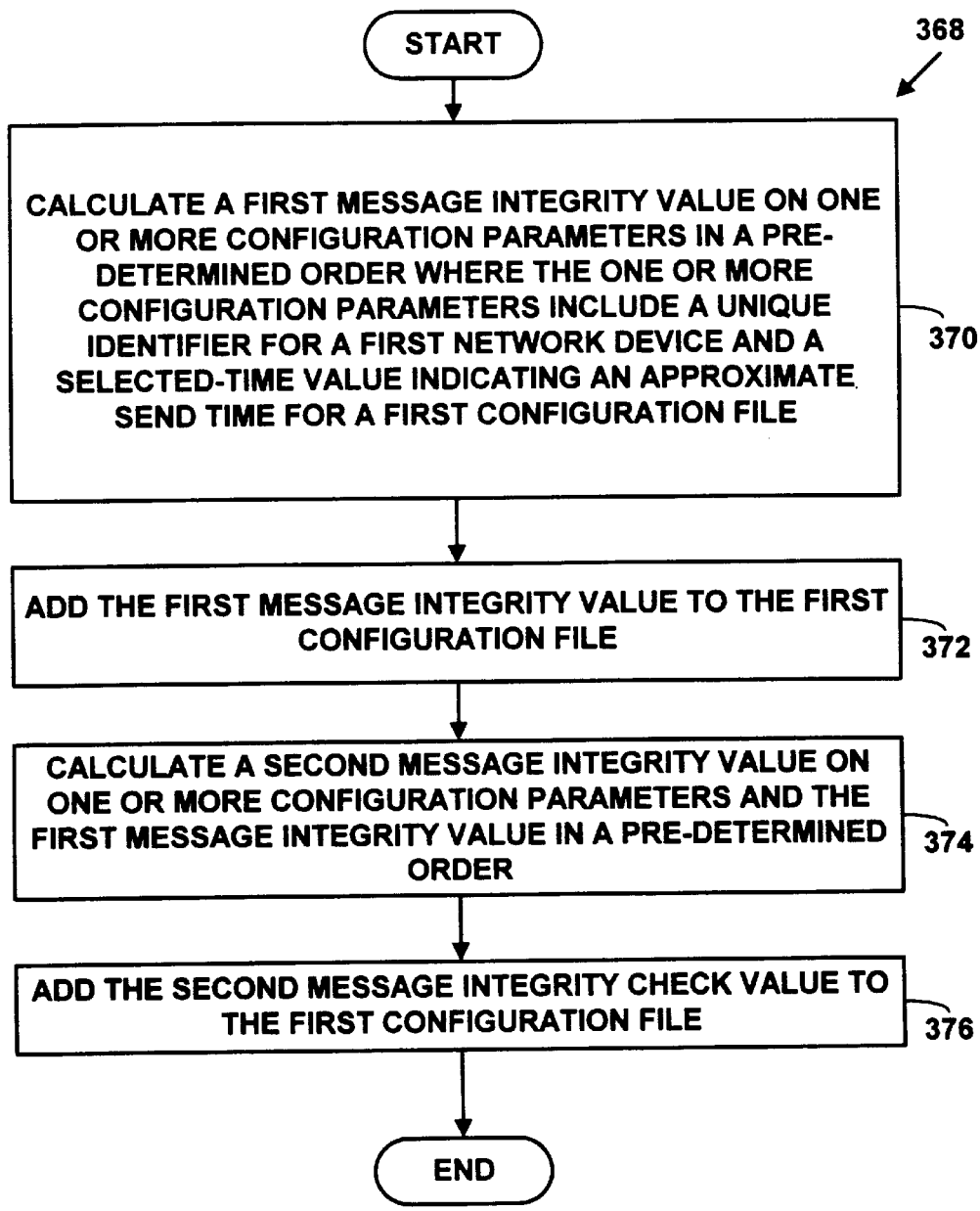
FIG. 21 is a flow diagram illustrating a method for calculating a message integrity value.

FIG. 21 is a flow diagram illustrating a method 368 to calculate a message integrity value (e.g., at step 346 of method 336 or step 362 of method 352). At step 370, a first message integrity value (e.g., CM-MIC) is calculated on one or more configuration parameters in a pre-determined order.

Returning again to FIG. 20, at step 364, the message integrity value (e.g., the CMTS-MIC value) is added to the configuration file. The message integrity value includes the unique identifier and selected time value added at steps 358 and 360 of method 352 and one or more configuration parameters (Table 10). At step 366, the configuration file with the message integrity value is sent from TFTP server 332 to CM 16 via CMTS 12 and cable network 14 on a downstream cable television connection.

Table 17 illustrates TLV data for an exemplary cable modem configuration file to configure CM 16 to browse a data network 28 such as the Internet or an intranet. However, the present invention is not limited to the configuration file in Table 17 and more or fewer configuration parameters could also be used.

TABLE 17

| Type | Length | Value | Notes |
|------|--------|-------|-------|
| T | 1 | 1 | Additional configuration parameters added |
| 4x | 6 | N/A | Header Length |
| 41 | 1 | 1 | Class-Of-Service-1 |
| 42 | 4 | 1,500,000 | Maximum downstream data rate of 1.5 Mbps |
| 43 | 4 | 256,000 | Maximum upstream data rate of 256 Kbps |
| 44 | 1 | 5 | Priority is level 5. |
| 45 | 4 | 8,000 | Minimum upstream data rate of 8 Kbps |
| 47 | 1 | 1 | Privacy enabled |
| 171 | 4 | 1 | Authorize timeouts |
| 3 | 1 | 1 | Enable network access |
| Z | 4 | Selected time-value, step 360 | Time now for security |
| Y | 4 | Network address, step 358 | CM 16 IP 54 address for security |
| 0 | N | N-byte padding | Padding to make message 4-byte aligned |
| 6 | 16 | CM-MIC | MD5 digest for CM 16 |
| 7 | 16 | Message integrity value, step 362 | MD5 digest for CMTS 12 (e.g., CMTS-MIC) |
| 255 | N/A | | End-of-file |

In one embodiment of the present invention, CM 16 uses the message integrity check value including at least the unique identifier and selected time-value to uniquely identify the configuration file and prevent another rouge cable modem from using the configuration parameters in the configuration file at a later time.

Figure 22:
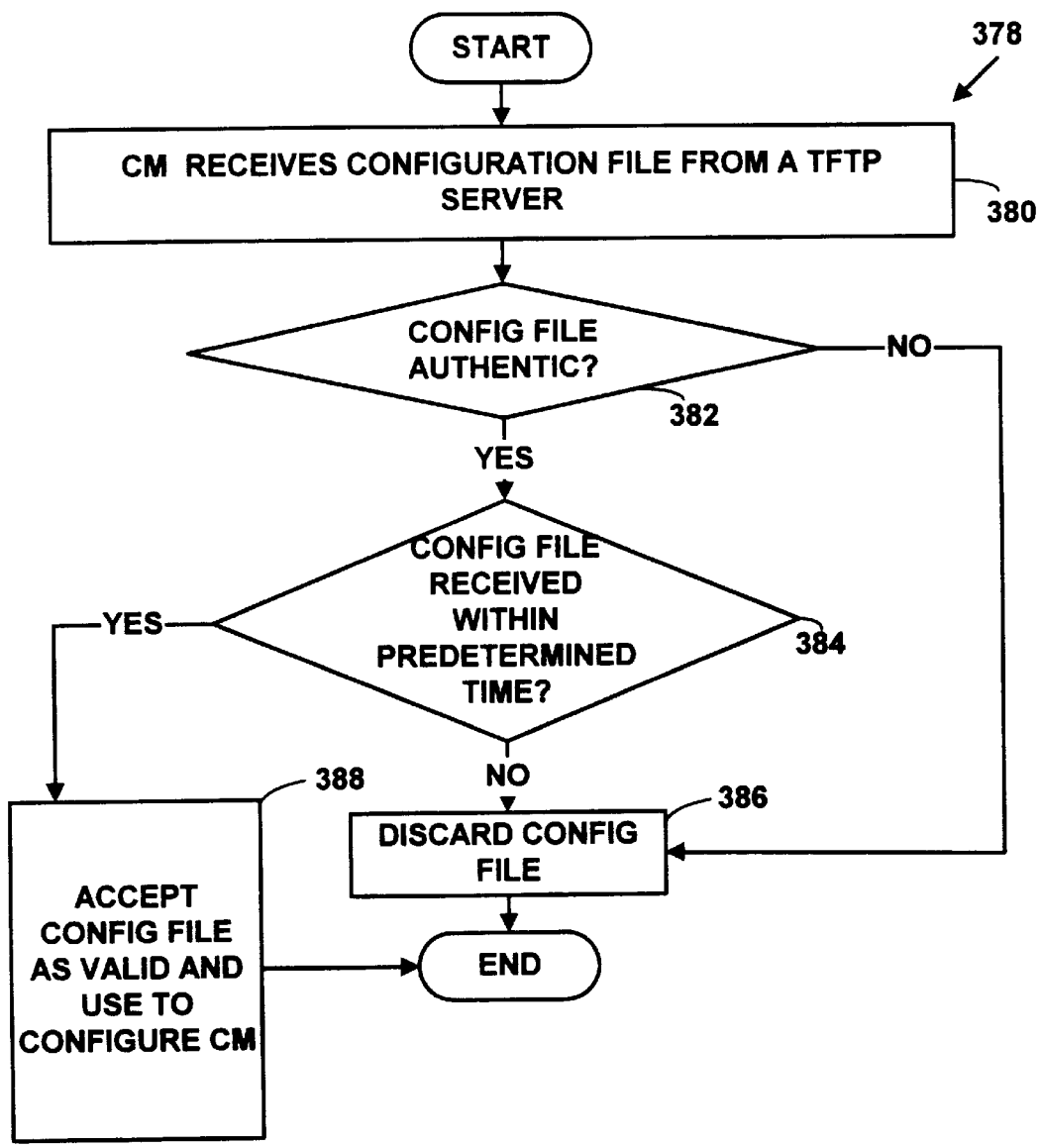
FIG. 22 is a flow diagram illustrating a method for checking validity of a cable modem configuration file.

FIG. 22 is a flow diagram illustrating a method 378 for checking validity of a configuration file on a cable modem. At step 380, CM 16 a configuration file is received from TFTP server 332 created with method 336 or method 352. At step 382, CM 16 determines if the configuration file is authentic by checking a first message integrity in the configuration file. CM 16 calculates a second message integrity value on fields in the configuration file in a predetermined order (Table 16) and compares it to the first message integrity check value. If the first and second message integrity values are the same, at step 384 CM 16 determines if the configuration file was sent within a predetermined time limit by comparing a selected time-value (Table 12) in the configuration file to a current time-value in CM 16.

As was described above, the selected time-value is a time value indicating an approximate time when the configuration file was sent based on the number of seconds since time 00:00, or midnight on Jan. 1, 1970. If the configuration file was not sent within a predetermined time limit (e.g., 5 seconds), the configuration file is discarded at step 386. In addition, if the configuration file was not authentic (step 382), it is also discarded at step 386.

If the configuration file was authentic and was received with a predetermined time (e.g., 5 seconds), CM 16 accepts the configuration file and uses the configuration parameters in the configuration file for configuration and initialization at step 388. CM 16 completes initialization by sending CMTS 12 a registration request message with information from the configuration file as well additional configuration parameters. The registration request message allows CM 16 to register with CMTS 12 to receive data from data network 28 and cable network 14.

Since the registration request message is subject to similar attacks by rouge users as was described for the configuration file, CM 16 also includes a unique identifier (i.e., CM 16 IP 54 address), a new selected-time value for sending the registration message and new a message integrity value in a secure registration request message using methods similar to the methods 336, 352 and 368 described above for an illustrative embodiment of the present invention. Sending a secure registration request message from CM 16 to CMTS 12 is described in co-pending Application No. assigned to the same assignee as the present application.

In an illustrative embodiment of the present invention, TFTP server 332 is called a "secure TFTP server" since configuration information for CM 16 is sent using an IP 54 address for CM 16 extracted from the TFTP RRQ message, a selected time-value indicating an approximate sending time of a configuration file to CM 16, and a message integrity check value calculated using IP 54 address, selected time-value and one or more other configuration parameters in a pre-determined order. Using methods 336, 352 and/or 368 in a secure TFTP server allows a cable modem to obtain configuration information from a TFTP server in a more secure manner.

An illustrative embodiment of the present invention provides improved secure cable modem initialization. For a rouge user to attack a data-over-cable system, the rouge user must intercept a configuration file, modify the selected time-value (on IP 54 address), re-calculate message integrity value with a rouge selected time value, and re-transmit the configuration file all within a pre-determined time period that is used by the cable modem (e.g., 5 seconds) for checking configuration files. Thus, an illustrative embodiment of the present invention reduces the possibility of attack by a rouge user and improves security in a data-over-cable system.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

I claim:

1. In a data-over-cable system including a plurality of network devices, a method of securely initializing a network device, the method comprising the following steps:

receiving a request a for first configuration file on a first protocol server from a first network device, the first configuration file including a plurality of configuration parameters to initialize the first network device;

adding a unique identifier for the first network device to the first configuration file;

adding a selected time-value to the first configuration file, wherein the selected time-value indicates a sending time for the first configuration file;

calculating a message integrity check value using the unique identifier, the selected time-value and one or more configuration parameters from the first configuration file in a pre-determined order to uniquely identify the first configuration file for the network device;

adding the message integrity check value to the first configuration file; and sending the first configuration file from the first protocol server to the first network device, wherein the first network device uses the message integrity check value, the unique identifier and the selected-time value indicating when the first message was sent from the first protocol server to verify the integrity of first configuration file.

2. A computer readable medium having stored therein instructions for causing a central processing unit to execute the method of claim 1.

3. The method of claim 1 wherein the step of calculating a message integrity check value includes calculating the message integrity check value with a cryptographic hashing function.

4. The method of claim 3 wherein the cryptographic hashing function is MD5.

5. The method of claim 1 wherein the step of adding a unique identifier for the first network device to the configuration file includes adding an Internet Protocol address for the first network device to the first configuration file.

6. The method of claim 1 wherein the first network device is a cable modem and the first protocol server is a secure Trivial File Transfer Protocol server.

7. The method of claim 1 wherein the first configuration file is a cable modem configuration file used to initialize a cable modem in the data-over-cable system.

8. The message of claim 1 wherein the selected time-value is a number of seconds the first network device has been executing.

9. The method of claim 8 wherein the number of seconds the first network device has been executing includes the number of seconds the first network device has been executing since time 00:00 on Jan. 1, 1970.

10. The method of claim 1 wherein the step of calculating a message integrity check value includes:

calculating a first message integrity value using the unique identifier, the selected time-value and one or more configuration parameters from the first configuration file in a predetermined order;

adding the first message integrity value to the first configuration file;

calculating a second message integrity value using the unique identifier, the selected time-value, one or more configuration parameters from the first configuration file and the first message integrity value in a pre-determined order; and adding the second message integrity value to first configuration file as the message integrity value.

11. In a data-over-cable system including a plurality of network devices, a method of securely initializing a network device, the method comprising the following steps:

receiving a first configuration file on a first network device from a first protocol server; and determining whether the first configuration file is valid using a message integrity check value included in the first configuration file, and if so, determining whether the first configuration file was sent within a pre-determined time using a selected time-value from the first configuration file, and if not, rejecting the first configuration file on the first network device.

12. A computer readable medium having stored therein instructions for causing a central processing unit to execute the method of claim 11.

13. The method of claim 11 wherein the first network device is a cable modem and the first protocol server is a secure Trivial File Transfer Protocol server.

14. The method of claim 11 wherein the message integrity check value includes a first unique identifier for the first network device, a selected time-value indicating a sending time for the first configuration file and a plurality of configuration parameters used to configure the first network device.

15. The method of claim 11 wherein the step of determining whether the first configuration file is valid using a message integrity check value included in the first configuration file includes calculating a second message integrity value using a cryptographic hashing function and comparing it to the message integrity check value.

16. The method of claim 15 wherein the cryptographic hashing function is MD5.

17. The method of claim 11 further comprising:

determining whether the first configuration file was sent within a predetermined time using a selected time-value from the first message integrity check value, wherein the first message integrity check value includes a unique identifier for the first network device and a selected time-value, and if so, accepting the configuration file on first network device; and initializing the first network device using configuration parameters from the first configuration file.

18. A secure protocol server for transferring a configuration file to a network device, the secure protocol server comprising:

unique identifier extractor, for extracting a unique identifier for a network device from a request message to uniquely identify the configuration file for the network device;

time-value selector, for selecting a time-value that is added to the configuration file and used to indicate a send time for the configuration file;

message integrity value calculator, for calculating a message integrity value using the unique identifier, selected time-value and one or more configuration parameters to uniquely identify the configuration file for a network device.

19. The secure protocol server of claim 18 wherein the secure protocol server is a secure Trivial File Transfer Protocol server.

20. The secure protocol server of claim 18 wherein the network device is a cable modem and the unique identifier selector selects an Internet Protocol address for a network device.

21. In a data-over-cable system including a plurality of cable modems, a method of securely initializing a cable modem, the method comprising the following steps:

receiving a request for a first configuration file on a Trivial File Transfer Protocol server from a cable modem, the first configuration file including a plurality of configuration parameters to initialize the cable modem;

adding an Internet Protocol address for the cable modem to the first configuration file;

adding a selected time-value to the first configuration file, wherein the selected time-value indicates a sending time for the requested first configuration file;

calculating a message integrity check value using a cryptographic hashing function with the Internet Protocol address, the selected time-value and one or more configuration parameters from the first configuration file in a predetermined order to uniquely identify the first configuration file for the cable modem;

adding the message integrity check value to the first configuration file; and sending the first configuration file from the Trivial File Transfer Protocol server to the cable modem, wherein the cable modem uses the message integrity check value, the unique identifier and the selected time-value indicating when the first configuration file was sent to the cable modem from the Trivial File Transfer Protocol server to verify the integrity of the first configuration file.

22. A computer readable medium having stored therein instructions for causing a central processing unit to execute the method of claim 21.

UNITED STATES PATENT AND TRADEMARK OFFICE
CERTIFICATE OF CORRECTION

PATENT NO. : 6,070,246

DATED : May 30, 2000

INVENTOR(S) : Nurettin B. Beser

It is certified that error appears in the above-identified patent and that said Letters Patent is hereby corrected as shown below:

On the Title Page:

REFERENCES CITED

U.S. Patent Documents:

| Patent No. | Date | Inventor | Class |
|---|---|---|---|
| 5,623,542 | 4/1997 | Schneider, et al. | 379/399 |
| 5,583,931 | 12/1996 | Schneider, et al. | 379/399 |
| 5,606,606 | 2/1997 | Schneider, et al. | 379/399 |
| 5,600,717 | 2/1997 | Schneider, et al. | 379/399 |
| 5,636,211 | 6/1997 | Newlin, et al. | 370/465 |
| 5,675,732 | 10/1997 | Majeti, et al. | 395 |
| 5,488,412 | 1/1996 | Majeti, et al. | 348 |
| 5,585,121 | 12/1996 | Moura, et al. | 370 |
| 5,347,304 | 9/1994 | Moura, et al. | 348 |
| 5,608,446 | 3/1997 | Carr, et al. | 348 |

Other Publications:

"Cable Modem to Customer Premise Equipment Interface Specification (Interim) SP-CMCI-I02-980317", Multimedia Cable Network Systems (MCNS) Holdings, L.P., 1998, Pgs. ii to 40.

"Operations Support System-Interface Specification Baseline Privacy Interface MIB (Interim Specification) SP-OSSI-BPI-I01-980331", MCNS Holdings, L.P., 1998, Pgs. ii to 33.

UNITED STATES PATENT AND TRADEMARK OFFICE
CERTIFICATE OF CORRECTION

PATENT NO. : 6,070,246            Page 2 of 2

DATED : May 30, 2000

INVENTOR(S) : Nurettin B. Beser

It is certified that error appears in the above-identified patent and that said Letters Patent is hereby corrected as shown below:

"Cable Modem Termination System-Network Side Interface Specification (Interim Specification SP-CMTS-NS1101-960702", MCNS Holdings, L.P., 1996, Pgs. ii to 13.

"Removable Security Module Interface Specification (Interim Specification) SP-RSMI-101-980204", MCNS Holdings, L.P., 1997, Pgs. ii to 48.

"Baseline Privacy Interface Specification (Interim) SP-BPI-I01-970922", MCNS Holdings, L.P., 1997, Pgs. ii to 66.

"Operations Support System Interface Specification (Interim) SP-OSSII07-970403", MCNS Holdings, L.P., 1997, Pgs. 1 to 30.

"Radio Frequency Interface Specification (Interim Specification) SP-RFI-I02-971008", MCNS Holdings, L.P., 1997, Pgs. ii to 186.

"Cable Modem Telephony Return Interface Specification (Interim) SP-CMTRI-I01-97804", MCNS Holdings, L.P., 1997, Pgs. ii to 74.

"Security Systems Specification (Interim Specification) SP-SSI-101-970506", MCNS Holdings, L.P., 1997, Pgs. ii to 103.

"Internet Engineering Task Force", Request for Comments 2131, Dynamic Host Configuration Protocol (DHCP) March 1997, Pgs. 1 to 42.

"S. Adiraju, J. Fijolek, IPCDN Telephony Return MIB, Internet Engineering Task Force, "IETF," Internet Draft,"<draft-ietf-ipcdn-tri-mib-00.1.txt>," March 23, 1998, Pgs. 1 to 26.

Signed and Sealed this

Twenty-seventh Day of March, 2001

*Attest:*

NICHOLAS P. GODICI

*Attesting Officer*      *Acting Director of the United States Patent and Trademark Office*